(12) United States Patent
Yamagishi et al.

(10) Patent No.: US 8,030,868 B2
(45) Date of Patent: Oct. 4, 2011

(54) ELECTRIC MOTOR, POWER APPARATUS USING THE SAME, AND SELF-PROPELLED SNOW REMOVER

(75) Inventors: Yoshihiko Yamagishi, Saitama (JP); Yoshihisa Hirose, Saitama (JP); Tsutomu Mizoroke, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 597 days.

(21) Appl. No.: 12/152,885

(22) Filed: May 16, 2008

(65) Prior Publication Data

US 2008/0289226 A1 Nov. 27, 2008

(30) Foreign Application Priority Data

May 21, 2007 (JP) ................................ 2007-134595
May 21, 2007 (JP) ................................ 2007-134631
May 21, 2007 (JP) ................................ 2007-134656

(51) Int. Cl.
*H02P 25/00* (2006.01)

(52) U.S. Cl. .............. 318/400.41; 310/114; 310/154.01; 310/154.33

(58) Field of Classification Search ............. 318/400.01, 318/400.02, 700, 727, 800, 599, 432, 434, 318/400.41; 310/12.15, 49.05, 49.06, 49.39, 310/49.44, 49.45, 154.01, 156.01, 46, 49.41, 310/156.25, 216.081, 154.33, 112, 114, 156.53; 37/196, 243, 246

See application file for complete search history.

(56) References Cited

U.S. PATENT DOCUMENTS

| 4,123,857 | A  | * | 11/1978 | Enters et al. ...................... 37/252 |
| 4,783,915 | A  | * | 11/1988 | Sasaki et al. ...................... 37/251 |
| 5,760,520 | A  | * | 6/1998 | Hasebe et al. ............ 310/156.19 |
| 6,131,316 | A  | * | 10/2000 | Yoshina et al. .................. 37/242 |
| 6,815,920 | B2 | * | 11/2004 | Cohen et al. .................... 318/599 |
| 6,909,215 | B2 | * | 6/2005 | Bryant ........................... 310/114 |
| 6,958,549 | B2 | * | 10/2005 | Wakitani et al. ............. 290/40 C |
| 7,122,930 | B2 | * | 10/2006 | Yamagishi et al. ....... 310/156.53 |
| 7,159,343 | B2 | * | 1/2007 | Hanafusa et al. ............... 37/244 |
| 7,224,093 | B2 | * | 5/2007 | Abadia et al. ............... 310/68 B |
| 7,492,074 | B1 | * | 2/2009 | Rittenhouse .................. 310/265 |
| 7,638,913 | B2 | * | 12/2009 | Ionel et al. ..................... 310/112 |
| 2003/0094912 | A1 | | 5/2003 | Wakitani |
| 2004/0021437 | A1 | | 2/2004 | Maslov et al. |

FOREIGN PATENT DOCUMENTS

| EP | 1 296 443 A2 | 3/2003 |
| JP | 08-051701 | 2/1996 |
| JP | 2004-225308 | 8/2004 |
| JP | 2006-014477 | 1/2006 |

\* cited by examiner

*Primary Examiner* — Walter Benson
*Assistant Examiner* — Antony M Paul
(74) *Attorney, Agent, or Firm* — Carrier Blackman & Associates, P.C.; Joseph P. Carrier; William D. Blackman

(57) ABSTRACT

A electric motor is disclosed in which torque ripple is reduced. The electric motor includes a single motor shaft. Rotors are disposed so as to be mutually offset in phase, and the rotors are secured to the motor shaft. Stators are arranged so as to individually correspond to the rotors, and the stators are disposed so as to be matched in phase. The phases of torque ripple generated in each motor unit, which is comprised of a combination of a single rotor and a single stator, are offset.

7 Claims, 20 Drawing Sheets

ELECTRIC MOTOR, POWER APPARATUS USING THE SAME, AND SELF-PROPELLED SNOW REMOVER

FIELD OF THE INVENTION

The present invention relates to an electric motor having a plurality of rotors arranged axially of a motor shaft thereof, to a power apparatus and to a self-propelled snow remover.

BACKGROUND OF THE INVENTION

Methods are currently known in which a plurality of rotors are arranged in an axial direction of a motor shaft in an electric motor, an example of which is disclosed in Japanese Patent Application Laid-Open Publication No. 2006-14477 (JP 2006-14477 A). The conventional electric motor disclosed in JP 2006-14477 A is provided with two motor units accommodated in a single housing.

Each motor unit is comprised of a motor shaft, an inner rotor provided to the motor shaft, and a cylindrical outer stator disposed so as to surround the inner rotor. The motor shafts of the motor units are concentrically disposed and rotate in a mutually independent manner.

The motor shaft of one of the motor units extends outward from one end of the housing. The motor shaft of the other motor units extends outward from the other end of the housing.

In accordance with this type of conventional electric motor, a plurality of loads can be driven by mutually independent motor shafts.

In general, torque ripple (torque fluctuation, pulsation) can be generated in an electric motor. Torque ripple can also be generated in the prior art electric motor at certain rotational angles of the inner rotors in the two mutually independent motor shafts. It is preferable to reduce the torque ripple in order to reduce vibrations of the electric motor and have the torque be efficiently outputted from the electric motor.

It is also possible to consider providing a skew (diagonal groove) to the inner rotor and the outer stator. However, an effective magnetic flux of the inner rotor and the outer stator is reduced by an amount commensurate with the extent to which such a skew is provided. Also, the configuration of the inner rotor and the outer stator is made more complicated and the number of manufacturing steps is increased by the presence of the skew. In view of the above, there is room for further improvement.

A regenerative braking device disclosed in, e.g., Japanese Patent Application Laid-Open Publication No. 8-51701 (JP 08-51701 A), is designed to prevent battery overcharging when regenerative braking is carried out in a power apparatus provided with a drive motor.

The regenerative braking device sends regenerative current to a bypass circuit having a resistor when the battery voltage has exceeded a reference voltage (charging end-voltage) during regenerative braking. The device sets the value of the command current during regenerative braking on the basis of the battery voltage and the control state of the motor performed by the controller. When the regenerative current from the motor has exceeded the command current, current that is commensurate with the difference therebetween is sent to a regenerative resistor. As a result, battery overcharging during regenerative braking is prevented.

However, a bypass circuit resistor and a regenerative resistor for sending very large regenerative current are required in the device. These resistors must be relatively large because they convert electrical energy (regenerative current) into thermal energy and radiate the energy. Furthermore, when the amount of heat generated by the resistors is considerable, an air cooling fan or another heat dissipating device must be provided. Since this leads to a more complicated structure, there is room for improvement.

A motor generally has drive current supplied from a driver circuit. The electric current supply capability of the driver circuit must be increased when the output torque of the motor is considerable. A driver circuit having a large electric current supply capability is large in size and produces a considerable amount of heat. A heat sink must be enlarged in order to cool the driver circuit. Therefore, there is a limit to reducing the size of the power apparatus.

There are cases in which the output torque of the motor can remain low depending on the operating state of the load driven by the motor. A relatively large drive current is supplied to the motor even in such cases. There is a limit to reducing wasted electric current consumption and to improving energy savings.

Next, a self-propelled snow remover provided with a travel mechanism made capable of self-propulsion by using an electric motor such as that described above will be described. Such a snow remover is disclosed in Japanese Patent Application Laid-Open Publication No. 2004-225308 JP 2004-225308 A).

The self-propelled snow remover described above is provided with an auger, an engine for driving the auger, a pair of left and right crawlers, and a pair of left and right electric motors for independently driving the pair of crawlers in a respective manner. The auger is driven by the engine alone. The pair of crawlers is driven by the pair of traveling electric motors alone.

When the crawlers are made to travel while removing snow using the auger, i.e., when the snow remover is made to travel and remove snow, the load on the crawlers is increased. Also, since the amount of snow removed by the auger is increased when the travel speed is increased, the crawlers are subjected to a greater load. Accordingly, snow remover is made to travel at low speed when the snow removal work is being performed. The characteristics of the traveling electric motors during snow removal should be able to provide low-speed rotation and high torque.

In a self-propelled snow remover, there are cases in which the operator desires to temporarily move (moving travel) the snow remover without having the auger perform snow removal. For example, there are cases in which the snow remover is placed in or removed from a storage location or is moved from the storage location to a nearby location for snow removal. In such cases, moving the snow remover at high speed is advantageous in terms of work efficiency. Also, since snow removal is not performed, the load on the crawlers is low. The characteristics of the traveling electric motors during moving travel should be able to provide high-speed rotation and low torque.

In this manner, the characteristics required in traveling electric motors are completely different when the self-propelled snow remover is operated for snow removal and when the snow remover is simply being moved. Electric drive motors for traveling that satisfy the characteristics of the two completely different situations are mounted on a conventional self-propelled snow remover. In other words, the traveling electric motors are capable of producing high torque. Therefore, power consumption is inevitably high in relative terms even when the snow remover is merely being moved.

In contrast, the battery for supplying power to the traveling electric motors is often a relatively low-capacity battery. The reason for this is that a large-capacity battery is not required because power can be constantly provided from the engine to the traveling electric motors via a power generator by driving the engine.

However, driving the engine in order to merely move the snow remover is a wasteful operation. It is more preferable to be able to drive the traveling electric motor by supplying power only from a low-capacity battery when the snow remover is merely being moved.

SUMMARY OF THE INVENTION

It is a first object of the present invention to reduce torque ripple using a simple configuration.

A second object of the present invention is to ensure a smaller power apparatus and energy savings, and to prevent overcharging of a battery during regenerative braking.

A third object of the present invention is to reduce the power consumption of a traveling electric motor in a self-propelled snow remover.

According to a first aspect of the present invention, there is provided an electric motor comprising: a motor shaft; a plurality of rotors arranged in an axial direction of and secured to the motor shaft; and a plurality of stators arranged in the axial direction so as to individually correspond to the rotors, wherein the stators are disposed with mutually matching phases while the rotors are disposed with mutually offset phases.

In the electric motor thus arranged, the rotors disposed with mutually offset phases are secured to a single motor shaft, and the phases of the stators are disposed in a matching arrangement. Thus, the phases of torque ripples produced in each motor unit comprised of a combination of a single rotor and a single stator can be offset. For this reason, torque ripple of the entire electric motor can easily be reduced. In addition, torque ripple can be reduced using a simple configuration in which a plurality of rotors disposed with mutually offset phases is secured to a single motor shaft.

According to a second aspect of the present invention, there is provided an electric motor comprising: a motor shaft; a plurality of rotors arranged in an axial direction of and secured to the motor shaft; and a plurality of stators arranged in the axial direction so as to individually correspond to the rotors, wherein the rotors are disposed with mutually matching phases while the stators are disposed with mutually offset phases.

In the electric motor thus arranged, the rotors disposed with mutually matching phases are secured to a single motor shaft, and the phases of the stators are disposed in a mutually offset arrangement. Thus, the phases of torque ripples produced in each motor unit comprised of a combination of a single rotor and a single stator can be offset. For this reason, torque ripple of the entire electric motor can easily be reduced. In addition, torque ripple can be reduced using a simple configuration in which the phases of a plurality of stators are mutually offset.

According to a third aspect of the present invention, there is provided a power apparatus comprising: an electric motor; a plurality of driver circuits for supplying drive current to the electric motor; a controller for controlling the driver circuit; the electric motor comprising: a motor shaft, at least one rotor provided on the motor shaft, and a plurality of stators arranged along the motor shaft in correspondence with the rotor, wherein each of the stators has an electrically independent winding, the driver circuit is comprised of a plurality of units for individually supplying drive current to each winding of the stators in the electric motor, and the controller individually controls the driver circuits so as to individually control the winding of each stator.

The electric motor used in the power apparatus is comprised of a single motor shaft, at least one rotor, and a plurality of stators. The winding of each stator is electrically independent in each of the stators. The driver circuits are divided into several units so as to individually supply drive current to the winding of each stator. The driver circuits are individually controlled by a controller. For this reason, the electric current supply capacity of the driver circuits can be kept low. The driver circuits can be reduced in size.

The driver circuits furthermore produce heat. In response to this situation, the driver circuits are divided into a plurality of units, and the heat radiated from the driver circuits can therefore be dispersed. Accordingly, a heat sink for cooling the driver circuits can be made smaller, and the power apparatus can be reduced in size.

It is preferred that the controller control the driver circuits such that drive current is supplied only to predetermined windings in the stator windings when a determination is made that a condition has been satisfied that the drive current supplied from the driver circuits to the electric motor has fallen below a predetermined reference current.

In this manner, drive current supplied to the electric motor is less than a predetermined reference current when the load on the electric motor is small. In this case, the controller controls the driver circuits so that drive current is supplied only to predetermined windings in the stator windings. The torque generated by the electric motor at this time is low.

On the other hand, the drive current supplied to the electric motor reaches a predetermined reference voltage when the load on the electric motor is high. In this case, the controller may perform control so as to supply drive current to all of the windings, for example. The torque generated by the electric motor at his time is high.

In this manner, the controller can individually control a plurality of drive circuits in accordance with fluctuations in the load placed on the electric motor because the driver circuits are divided into a plurality of units. In other words, drive current is supplied only to the required windings. As a result, wasted power consumption (drive current) by the electric motor can be easily reduced, and energy savings can be promoted. Also, the power apparatus is provided with a simple configuration.

It is also desired that the controller send different control signals to each of the driver circuits when both a condition that a voltage of a battery for supplying power to the electric motor has exceeded a predetermined reference voltage and a condition that a regenerative electric current sent to the electric motor during regenerative braking has exceeded a predetermined reference regenerative electric current are determined to have been satisfied, and the controller sends a same control signal to all of the driver circuits when the two conditions are not satisfied.

In this manner, different control signals can be sent from the controller to each of the drive circuits in order to prevent overcharging of the battery by regenerative braking when the battery is fully charged. For this reason, there is no need to provide a resistor through which large regenerative current is sent when the battery is fully charged. Therefore, a power apparatus that is capable of regenerative braking can be achieved in a simple configuration.

According to a fourth aspect of the present invention, there is provided a self-propelled snow remover comprising: snow-removal implements including an auger and a dozer; travel devices including crawlers and wheels; and traveling electric motors provided for exclusively driving the travel devices, wherein each of the traveling electric motors comprise: a motor shaft; a rotor provided on the motor shaft; and a stator disposed in such a manner as to correspond to the rotor, one of the rotor and the stator being divided into a plurality of members arranged in an axial direction of the motor, the divided members each having electrically independent winding.

Thus, the torque generated by the traveling electric motors can be reduced by supplying drive current to only one of the windings divided in the axial direction of the motor, for example.

On the other hand, the torque generated by the traveling electric motors can be increased by supplying drive current to all of the windings.

In this manner, power consumption can be reduced even when the traveling electric motor is small and has a simple configuration, because the supply of drive current to a plurality of windings is merely changed.

It is preferred that the snow remover further comprise: a plurality of driver circuits for individually supplying drive current to the winding of each of the divided members; and a controller for controlling the traveling electric motors by sending a control signal to the driver circuits.

In this manner, the driver circuit is divided into a plurality of units so as to individually supply drive current to the winding of each of the divided members. Accordingly, the electric current supply capacity of the driver circuits can be kept low and the driver circuits can be reduced in size.

The driver circuits generate heat. In response to this situation, the driver circuits are divided into a plurality of units, and the heat radiated from the driver circuits can be dispersed. Accordingly, a heat sink for cooling the driver circuits can be made smaller, and the power apparatus comprised of the electric motor, the driver circuits, and the controller can be reduced in size.

It is also preferred that the controller control the driver circuits such that drive current is supplied only to predetermined windings in the stator windings when a determination is made that a condition that the drive current supplied from the driver circuits to the electric motor has fallen below a predetermined reference current has been satisfied.

The load on the electric motor is low when the self-propelled snow remover is made to travel without removing snow by the snow removing implement. As a result, the drive current supplied to the traveling electric motors is less than a predetermined reference current. In this case, the controller performs control so as to supply drive current only to predetermined windings in the windings. As a result, the torque generated by the traveling electric motors is low.

On the other hand, the load on the traveling electric motors is high when the self-propelled snow remover is made to travel while removing snow by the snow removing implement. As a result, the drive current supplied to the traveling electric motors reaches a predetermined reference current. In this case, the controller can perform control so as to supply drive current to all of the windings, for example. As a result, the torque generated by the electric motor is high. Also, the traveling electric motors can be rotated at low speed in accordance with the speed set by the operator.

In this manner, the power consumption of the traveling electric motors can be reduced using a simple configuration because the supply of drive current to the traveling electric motors is merely changed depending on whether snow is being removed by the snow removing implement.

It is also preferred that the controller send different control signals to each of the driver circuits when both a condition that a voltage of a battery for supplying power to the electric motor has exceeded a predetermined reference voltage and a condition that a regenerative electric current sent to the electric motor during regenerative braking has exceeded a predetermined reference regenerative electric current are satisfied, and the controller sends a same control signal to all of the driver circuits when the two conditions are not satisfied.

The load on the electric motor is low when the self-propelled snow remover is made to travel without removing snow by the snow removing implement. In this case, the controller performs control so as to supply drive current only to predetermined windings in the windings. As a result, the torque generated by the traveling electric motors is low.

On the other hand, the load on the traveling electric motors is high when the self-propelled snow remover is made to travel while removing snow by the snow removing implement. In this case, the controller can perform control so as to supply drive current to all of the windings, for example. As a result, the torque generated by the electric motor is high. Also, the traveling electric motors can be rotated at low speed in accordance with the speed set by the operator.

In this manner, the power consumption of the traveling electric motors can be reduced using a simple configuration because the supply of drive current to the traveling electric motors is merely changed depending on whether snow is being removed by the snow removing implement.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

Referring to FIGS. 1 to 6, description will be made as to the arrangement of an electric motor for traveling.

Figure 1:
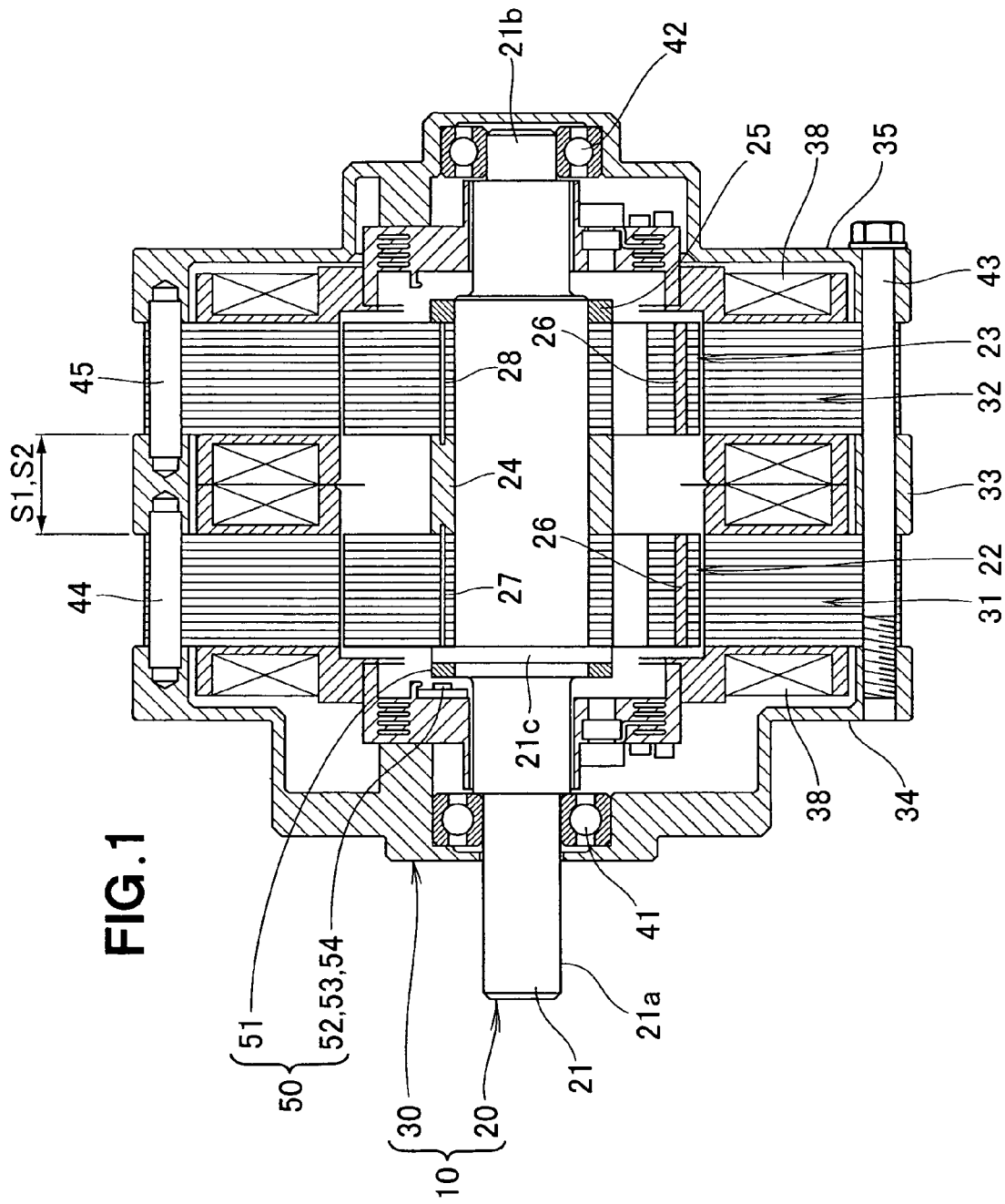
FIG. 1 is a cross-sectional illustrating an electric motor according to an embodiment of the present invention.
Figure 2:
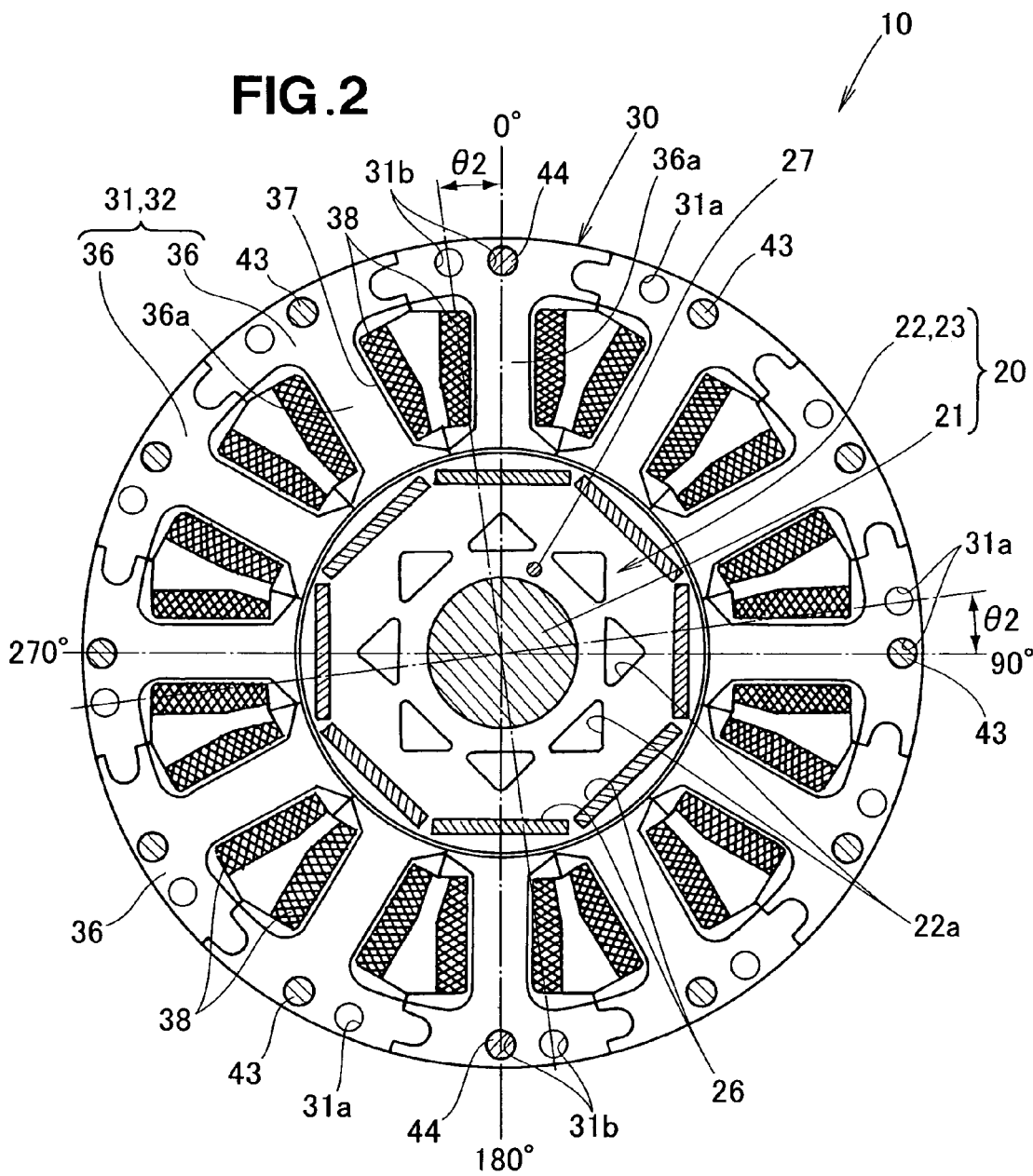
FIG. 2 is a cross-sectional view showing the electric motor of FIG. 1, as viewed from an axial direction of the motor.

The traveling electric motor 10 is comprised of a rotor block 20 and a stator block 30, as shown in FIGS. 1 and 2, and is a brushless inner-rotor DC motor. Hereinafter, the traveling electric motor 10 will also be referred to simply as "electric motor 10."

First, the rotor block 20 will be described.

Figure 3:
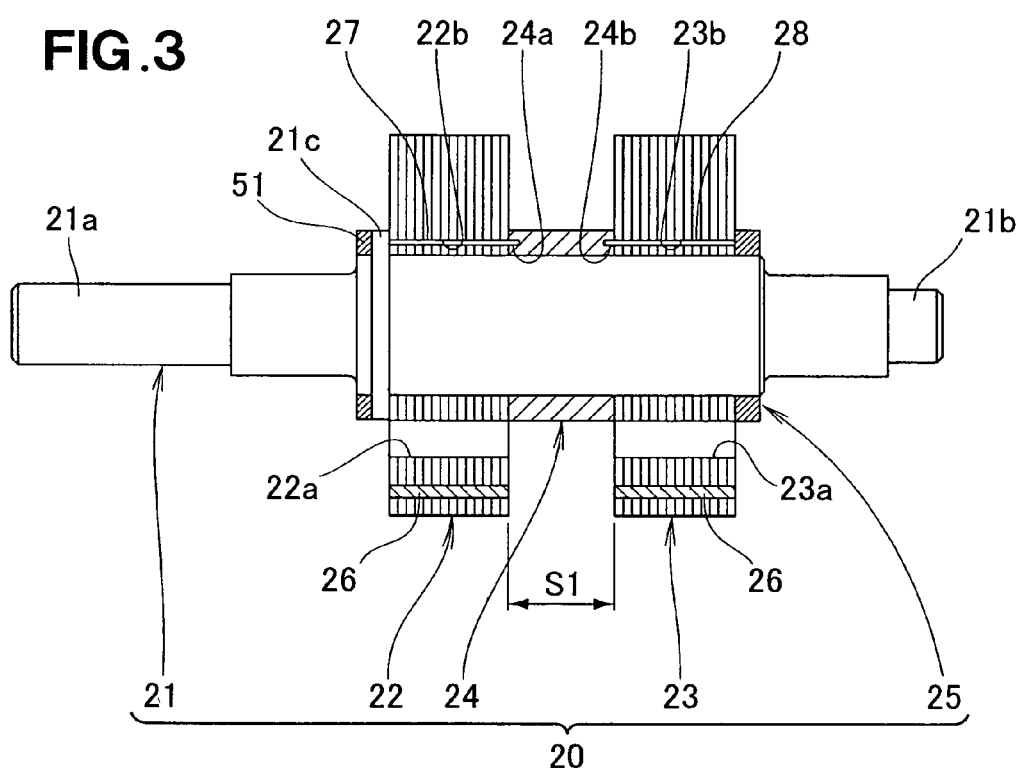
FIG. 3 is a cross-sectional view showing the rotor block of FIG. 1.

The rotor block 20 is comprised of a single motor shaft 21, a plurality of rotors 22, 23, a single inter-rotor spacer 24, and a single fixed ring 25, as shown in FIGS. 1 and 3.

A first end 21a of the motor shaft 21 is configured as an output end for outputting torque, as shown in FIG. 3. A second end 21b of the motor shaft 21 is configured as a bearing end. The motor shaft 21 has a discoid flange 21c integrally formed midway along the lengthwise direction near the output end 21a.

The plurality (e.g., two) of rotors 22, 23 is comprised of inner rotors divided by a plurality of members in the axial lengthwise direction of the motor shaft 21. An annular inter-rotor spacer 24 is disposed between the two rotors 22, 23. For this reason, the two rotors 22, 23 are arranged with a fixed space S1 (air gap) in the axial lengthwise direction of the motor shaft 21. The fixed space S1 is defined by the length of the inter-rotor spacer 24. It is apparent that the length and outside diameter of the inter-rotor spacer 24 are preferably set to a size in which magnetic flux does not flow between the rotors 22, 23.

The two rotors 22, 23 are annular members secured by, e.g., press-fitting to the motor shaft 21. Of the two rotors 22, 23, the rotor disposed near the output end 21a is referred to as a first rotor 22, and the rotor disposed near the bearing end 21b is referred to as a second rotor 23. The first rotor 22 is disposed in a position in contact with the flange 21c.

Figure 4:
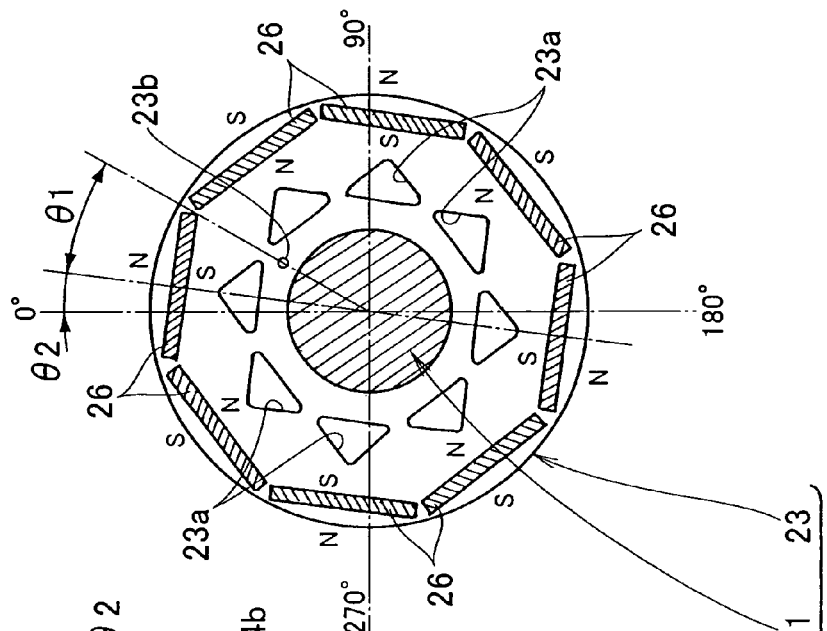
FIG. 4 is a view of each part of the rotor block of FIG. 3, as viewed from an axial direction of the motor.
Figure 4:
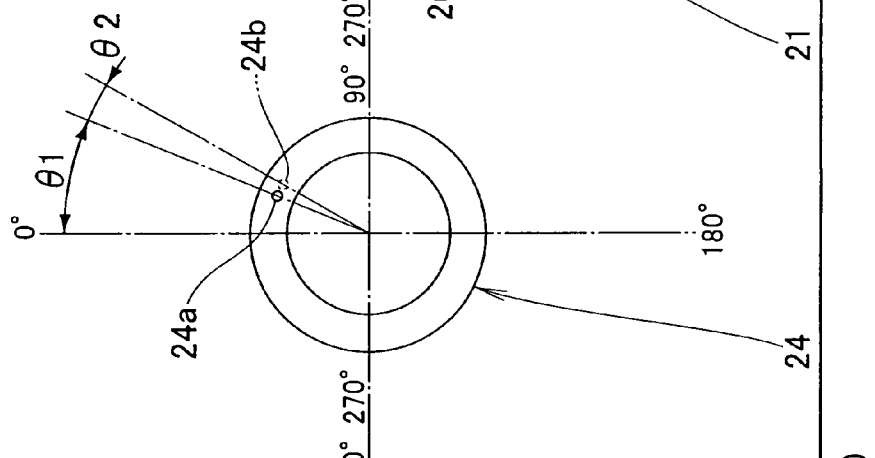
Figure 4:
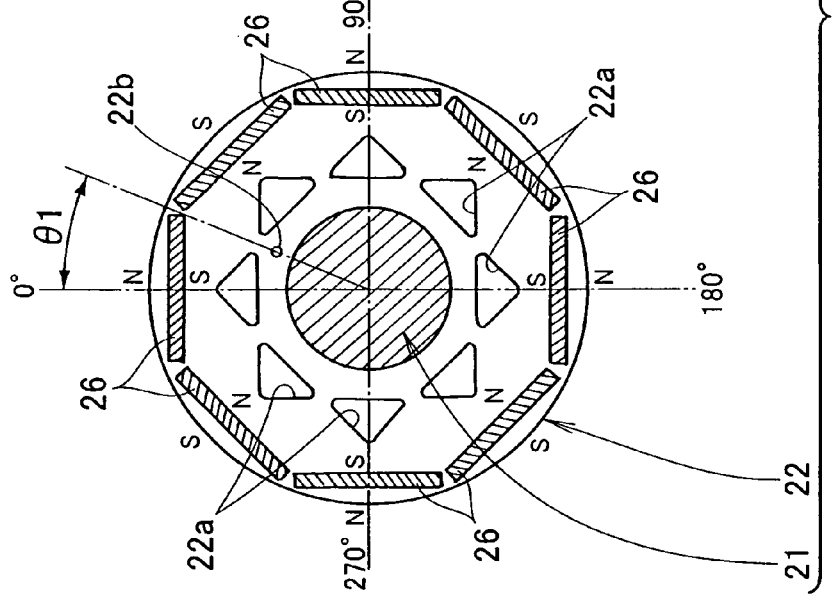

FIG. 4 is a view of each part of the rotor block 20 shown in FIG. 3 as viewed from the axial direction of the motor. FIG. 4A shows the first rotor 22. FIG. 4B shows the inter-rotor spacer 24. FIG. 4C shows the second rotor 23.

In FIGS. 2 and 4, the phases of the first and second rotors 22, 23 and the inter-rotor spacer 24 are set so that a single location on the periphery of each is set to a reference angle 0°; and the angles 90°, 180°, and 270° are set in the clockwise direction.

The rotors 22, 23 are composed by layering several discoid stacked plates comprised of thin magnetic plates, as shown in FIGS. 3 and 4. A plurality (e.g., eight) of permanent magnets 26 is secured by press-fitting at an equidistant pitch in the peripheral direction near the external peripheral surfaces of the rotors 22, 23. The eight permanent magnets 26 are long thin plate-shaped members magnetized in the direction of the plate surface. The permanent magnets 26 are radially arranged, with one surface facing outward, and extend along the motor shaft 21. The permanent magnets 26 furthermore have the N and S poles alternately arranged in the peripheral direction.

The rotors 22, 23 have a plurality of air vents 22a, 23a between the motor shaft 21 and the permanent magnets 26.

The air vents 22a, 23a are arranged with the same phases as the permanent magnets 26, and pass completely through along the motor shaft 21. Heat at the center portion of the rotors 22, 23 can be radiated to the atmosphere by providing a plurality of air vents 22a, 23a.

The rotor block 20 is integrally assembled by sequentially fitting the first rotor 22, the inter-rotor spacer 24, the second rotor 23, and a securing ring 25 onto the motor shaft 21 from the side of the bearing end 21b toward the output end 21a.

The inter-rotor spacer 24 loosely fits (a clearance fit) on the motor shaft 21. An "interference fit" is used as the method of fitting the two rotors 22, 23 onto the motor shaft 21 and as the method of fitting the securing ring 25 onto the motor shaft 21. An "interference fit" is a method of fitting in which an "interference" is constantly present when a hole and a shaft are assembled, i.e., a maximum diameter of the hole is less than or, in extreme cases, equal to a minimum diameter of the shaft. "Interference" refers to the difference between the diameter of the hole and the diameter of the shaft prior to assembly when the diameter of the shaft is greater than the diameter of the hole.

In this manner, the two rotors 22, 23 secured by press-fitting to the motor shaft 21 are mounted so as to be incapable of rotating with respect to the motor shaft 21 and so as to be incapable of sliding in the axial direction. Since only press-fitting is used, there is no need to provide a baffle such as a key groove or a serration. Accordingly, the configuration is very simple and the assembly work is straightforward.

The first and second rotors 22, 23 are offset from each other in phase at an angle θ2, as shown in FIGS. 3 and 4. In other words, the second rotor 23 is offset in phase with respect to the first rotor 22 by the angle θ2 in the clockwise direction from the reference angle 0°. The angle θ2 is about 7.5°, as described later.

The first rotor 22 has a single air vent 22a and a single permanent magnet 26 disposed in the position of the reference angle 0°, and has other air vents 22a and other permanent magnets 26 disposed in sequence in the clockwise direction. The second rotor 23 has a single air vent 23a and a single permanent magnet 26 disposed in a position that is offset in phase by the angle θ2 in the clockwise direction from the reference angle 0°, and other air vents 23a and other permanent magnets 26 disposed in sequence in the clockwise direction.

More specifically, the inter-rotor spacer 24 has a first positioning hole 24a opened in a surface that faces the first rotor 22, and a second positioning hole 24b opened in a surface facing the second rotor 23. The first and second positioning holes 24a, 24b are bottomed holes disposed in phases mutually offset by an angle θ2.

The first positioning hole 24a is disposed in the inter-rotor spacer 24 in a position offset by an angle θ1 in the clockwise direction from the reference angle 0°. The angle θ1 is about 22.5°. The second positioning hole 24b is disposed in a position offset by an angle θ2 further in the clockwise direction from the first positioning hole 24a. In other words, the second positioning hole 24b is offset in phase by the angle θ2 in the clockwise direction in relation to the first positioning hole 24a.

The first rotor 22 has a rotor-side first positioning hole 22b that passes completely through to a position (a position offset by the angle θ1 in the clockwise direction from the reference angle 0°) that faces the first positioning hole 24a. The second rotor 23 has a rotor-side second positioning hole 23b that passes completely through to a position that faces the second positioning hole 24b.

A single first positioning pin 27 (FIG. 1) is fitted into the first positioning holes 22b, 24a, and a single second positioning pin 28 (FIG. 1) is fitted into the second positioning holes 23b, 24b, whereby the two rotors 22, 23 are disposed in phases mutually offset from each other. Accordingly, the phases can be matched by simple positioning work with the two rotors 22, 23 in a very simple configuration. The presence or absence of positioning by the positioning pins 27, 28 is arbitrary.

Next, the stator block 30 will be described.

Figure 5:
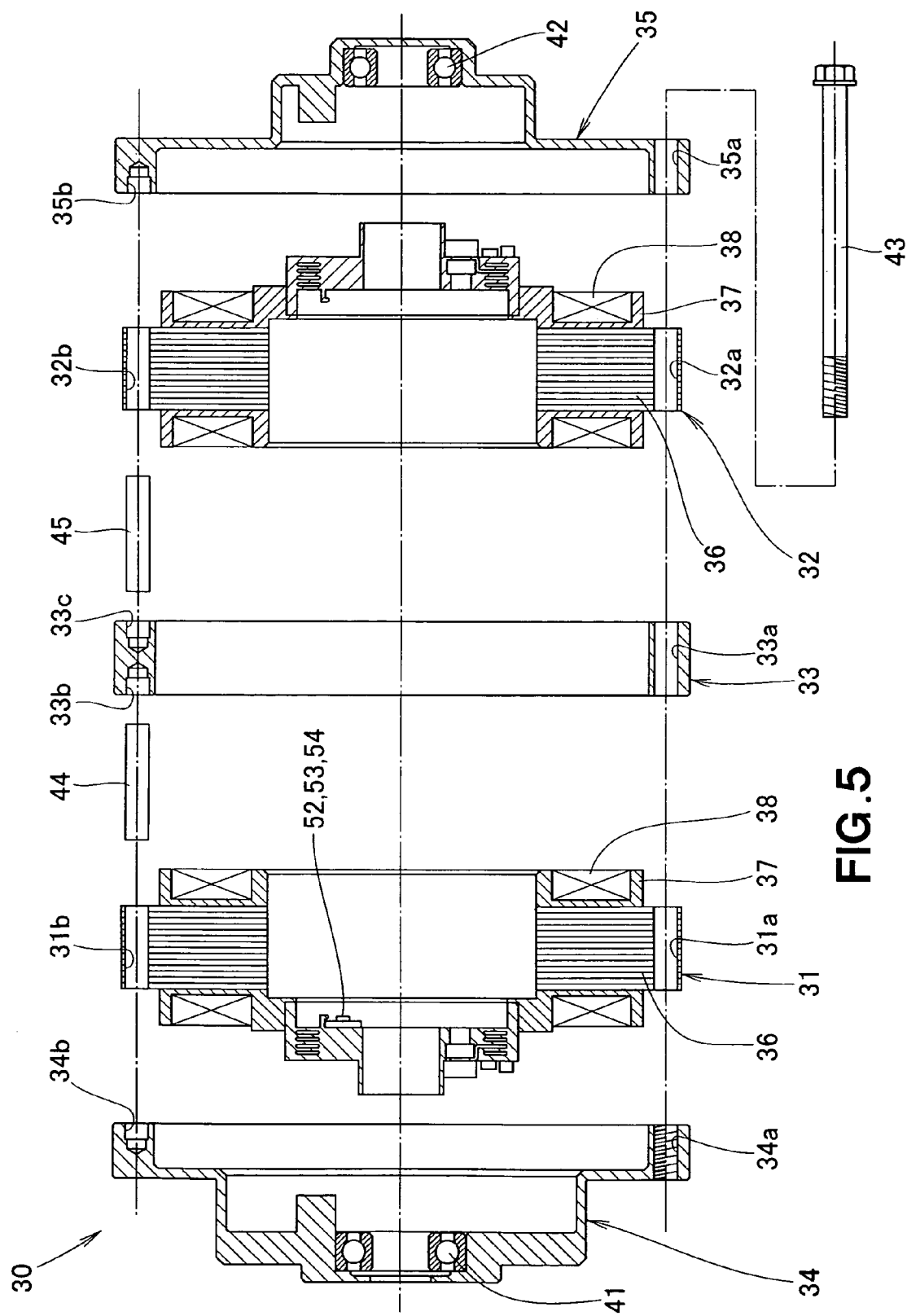
FIG. 5 is an exploded cross-sectional view showing the stator block of FIG. 1.

FIG. 5 shows the stator block 30 shown in FIG. 1.

The stator block 30 is comprised of a plurality of stators 31, 32, a single inter-stator spacer 33, and two covers 34, 35, as shown in FIGS. 1, 2, and 5.

The plurality (e.g., two) of stators 31, 32 is comprised of annular outer stators divided by a plurality of members in the axial direction of the motor shaft 21 and disposed so as to individually correspond to the rotors 22, 23, as shown in FIGS. 1 and 5. Of the two stators 31, 32, the first stator 31 is defined as the stator disposed so as to correspond to the first rotor 22, and the second stator 32 is defined as the stator disposed so as to correspond to the second rotor 23.

The rotors 22, 23 and the stators 31, 32 are concentrically disposed with respect to the motor shaft 21. The rotors 22, 23 are disposed having a slight gap (air gap) inside the corresponding stators 31, 32.

An annular inter-stator spacer 33 is disposed between the two stators 31, 32. Accordingly, the two stators 31, 32 are arranged having a fixed space S2 (air gap) in the axial direction of the motor shaft 21. The fixed space S2 is defined by the length of the inter-stator spacer 33. The outside diameter of the inter-stator spacer 33 is substantially the same as the outside diameter of the stators 31, 32. It is apparent that the length, inside diameter, and outside diameter of the inter-rotor spacer 33 are preferably set to a size in which magnetic flux does not flow between the stators 31, 32.

The stators 31, 32 are composed by layering several stacked plates comprised of thin magnetic plates. More specifically, the stators 31, 32 are annularly formed by connecting a plurality of teeth 36 comprised of thin plates that are formed substantially in the shape of the letter T in the peripheral direction as viewed from the axial direction of the motor, as shown in FIG. 2. The number of the teeth 36 is set in accordance with the number of poles of the stators 31, 32; for example, 12 teeth may be combined in the peripheral direction. Salient poles 36a of the teeth 36 are disposed so as to extend toward the motor shaft 21. As a result, 12 salient poles 36a are radially disposed with respect to the motor shaft 21. Each of the 12 salient poles 36a has a bobbin 37. An electric armature winding 38 is wound about each of the bobbins 37.

In this manner, the stators 31, 32 each have 12 windings 38 arranged in the peripheral direction in correspondence with the eight permanent magnets 26, respectively. Hereinafter, the windings 38 will be simply referred as "windings 38." The winding direction of the all of the windings 38 is the same direction. The 12 windings 38 are brought together in three winding phases 61 to 63 (see FIG. 9), as described in detail hereinbelow.

Of the two covers 34, 35, the cover disposed on the first stator 31 is referred to as a first cover 34, and the cover disposed on the second stator 32 is referred to as a second cover 35.

The first cover 34 covers the axial exterior of the first stator 31 and rotatably supports the output end 21a of the motor shaft 21 via a bearing 41. The second cover 35 covers the axial exterior of the second stator 32 and rotatably supports the bearing end 21b of the motor shaft 21 via a bearing 42.

The stators 31, 32, the inter-stator spacer 33, and the covers 34, 35 have a plurality of bolt holes 31a, 32a, 33a, 34a, 35a, respectively, in order to be mutually connected by a plurality of bolts 43 in the vicinity of the external periphery, as shown in FIGS. 2 and 5. The bolt holes of the first cover 34 are screw holes.

The stator block 30 is integrally assembled by sequentially superimposing the first stator 31, the inter-stator spacer 33, the second stator 32, and the second cover 35 onto the first cover 34, and coupling the assembly together by using a plurality of bolts 43.

In FIGS. 2 and 5, the phases of the first and second stators 31 and 32 and the inter-stator spacer 33 are set so that a single location on the periphery of each is set to a reference angle 0°, and the angles 90°, 180°, and 270° are set in the clockwise direction.

The first and second stators 31, 32 are disposed in mutually matching phases, as shown in FIGS. 2 and 5. The first and second stators 31, 32 have a single winding 38 disposed in the position of the reference angle 0°, and other windings 38 sequentially disposed in the clockwise direction.

More specifically, the inter-stator spacer 33 has two first positioning holes 33b, 33b (see FIG. 5) opened in a surface facing the first stator 31, and two second positioning holes 33c and 33c (see FIG. 5) opened in a surface facing the second stator 32. The first and second positioning holes 33b and 33c are bottomed holes disposed with mutually matching phases. The two first positioning holes 33b, 33b are symmetrically disposed (in the 0° and 180° positions) with respect to the motor shaft 21. The two second positioning holes 33c, 33c are symmetrically disposed (in the 0° and 180° positions) with respect to the motor shaft 21.

The first stator 31 has a stator-side first positioning hole 31b that passes completely through in a position that faces the first positioning hole 33b. The second stator 32 has a stator-side second positioning hole 32b that passes completely through in a position that faces the second positioning hole 33c.

The first cover 34 has a bottomed cover-side first positioning hole 34b in a position facing the first positioning hole 33b. The second cover 35 has a bottomed cover-side second positioning hole 35b in a position facing the second positioning hole 33c. A first positioning pin 44 is fitted into the first positioning holes 31b, 33b, 34b, and a second positioning pin 45 is fitted into the second positioning holes 32b, 33c, 35b, whereby the two stators 31, 32 are disposed with mutually matching phases. Accordingly, the two stators 31, 32 can be set with matching phases by using a very simple configuration and straightforward positioning work. The presence or absence of positioning by the positioning pins 44, 45 is arbitrary.

The electric motor 10 may have the configuration of the following modified example. In other words, the electric motor 10 may be configured so that the rotors 22, 23 is disposed with mutually matching phases, and the phases of the stators 31, 32 may be mutually offset, as shown in FIG. 6.

Figure 6:
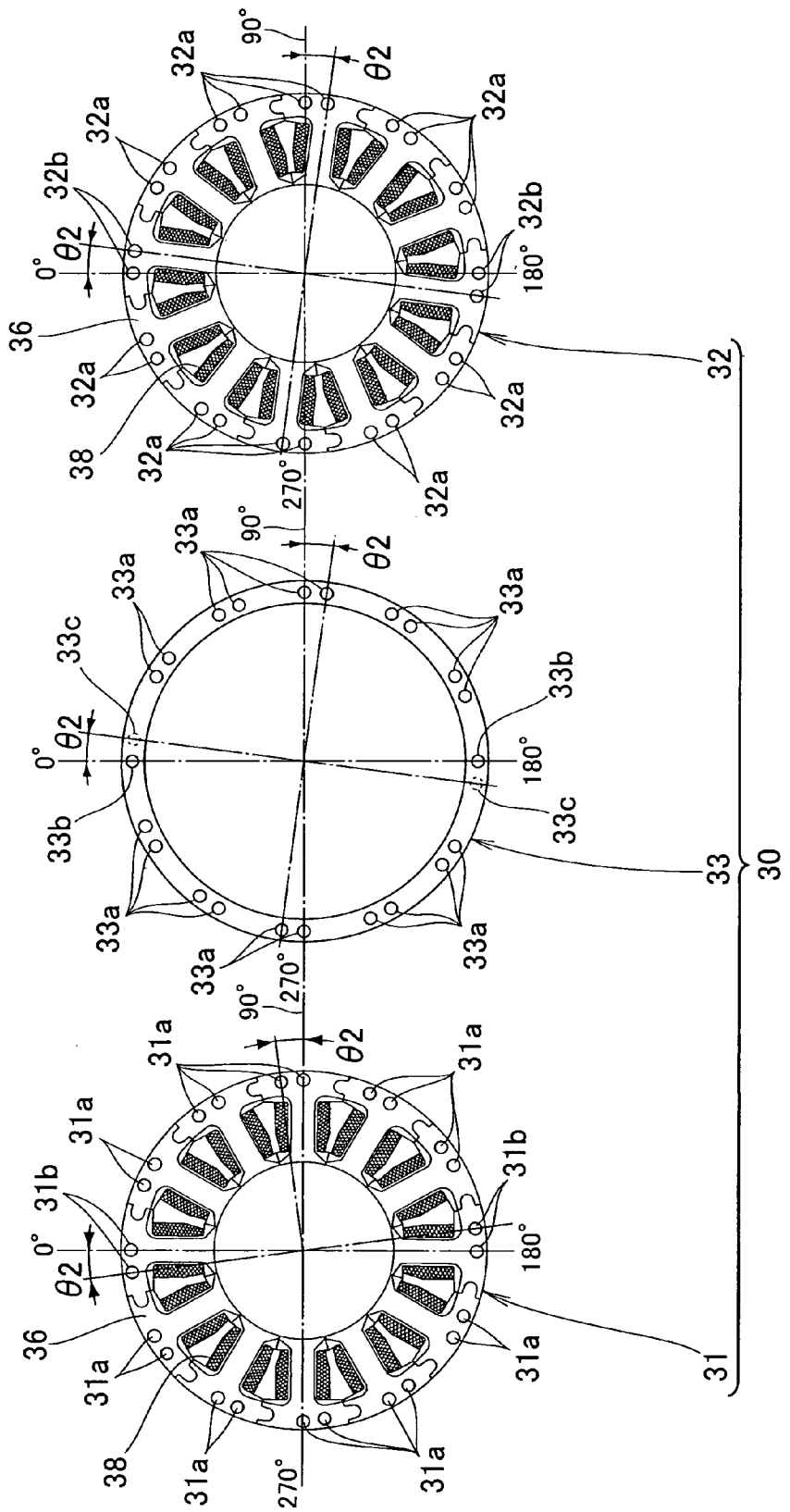
FIG. 6 illustrates parts of the stator block of FIG. 5, as viewed from an axial direction of the motor.

FIG. 6 shows a modified example of the stator block shown in FIG. 5, and shows the parts of the stator block 30 shown in FIG. 5 as viewed from the axial direction of the motor. FIG. 6A shows the first stator 31. FIG. 6B shows the inter-stator spacer 33. FIG. 6C shows the second stator 32.

The first and second stators 31, 32 are offset from each other in phase at an angle θ2, as shown in FIG. 6. In other words, the second stator 32 is offset in phase with respect to the first stator 31 by the angle θ2 in the clockwise direction from the reference angle 0°. The angle θ2 is about 7.5°, as described above.

The first stator 31 has a single winding 38 disposed in the position of the reference angle 0°, and has other windings 38 disposed in sequence in the clockwise direction. The second stator 32 has a single winding 38 disposed in a position that is offset in phase by the angle θ2 in the clockwise direction from the reference angle 0°, and other windings 38 disposed in sequence in the clockwise direction.

More specifically, the second positioning hole 33c in the inter-stator spacer 33 is offset in phase by the angle θ2 in the clockwise direction from the reference angle 0° with respect to the first positioning hole 33b.

The inter-stator spacer 33 has twice the number of bolt holes 33a as the embodiment shown in FIG. 2. The phases of the bolt holes 33a are in positions that are offset in phase by the angle θ2 in the clockwise direction from the positions of the bolt holes 33a shown in FIG. 2 described above.

The first stator 31 has four first positioning holes 31b. The four first positioning holes 31b are disposed, one each, in the 0° and 180° positions and one each in positions offset in phase by the angle θ2 in the counterclockwise direction.

The first stator 31 has twice the number of bolt holes 31a as the embodiment shown in FIG. 2. The phases of the additional plurality of bolt holes 31a are in positions that are offset in phase by the angle θ2 in the counterclockwise direction of the positions of the bolt holes 31a shown in FIG. 6A described above.

The second stator 32 has four first positioning holes 32b. The four first positioning holes 32b are disposed, one each, in the 0° and 180° positions and one each in positions offset in phase by the angle θ2 in the clockwise direction.

The second stator 32 has twice the number of bolt holes 32a as the embodiment shown in FIG. 2. The phases of the additional plurality of bolt holes 32a are in positions that are offset in phase by the angle θ2 in the clockwise direction of the positions of the bolt holes 32a shown in FIG. 6C described above.

First positioning pins 44 and 44 are fitted into the two first positioning holes 33b, 33b, and second positioning pins 45, 45 are fitted into the second positioning holes 33c, 33c, whereby the two stators 31, 32 are disposed with mutually offset phases, as shown in FIGS. 2, 5, and 6.

In this manner, in accordance with the modified example, a plurality of stators 31, 32 can be provided with the same configuration, and productivity is therefore improved.

The electric motor 10 is provided with a phase detecting sensor 50 for detecting the phase of the rotors 22, 23, as shown in FIGS. 1 and 3. The phase detecting sensor 50 is comprised of a sensor rotor 51 disposed on the end surface of the flange 21c of the motor shaft 21, and three detectors 52, 53, 54 for magnetically detecting the phase of the sensor rotor 51. The sensor rotor 51 has a plurality (e.g., eight in accordance with the arrangement of the permanent magnets 26 of the rotors 22, 23) of permanent magnets arranged at an equidistant pitch along the entire periphery about the center of the motor shaft 21. The three detectors 52, 53, 54 are radially arranged with an equidistant pitch about the center of the motor shaft 21, and is comprised of a Hall IC, for example.

Next, a self-propelled snow remover in which the traveling electric motor 10 described above is mounted will be described with reference to FIGS. 7 to 10. For the sake of convenience in referring to left and right members, L is used as the reference numeral for members on the left, and R is used as the reference numeral for members on the right. The same applies to the traveling electric motor 10 described above.

Figure 7:
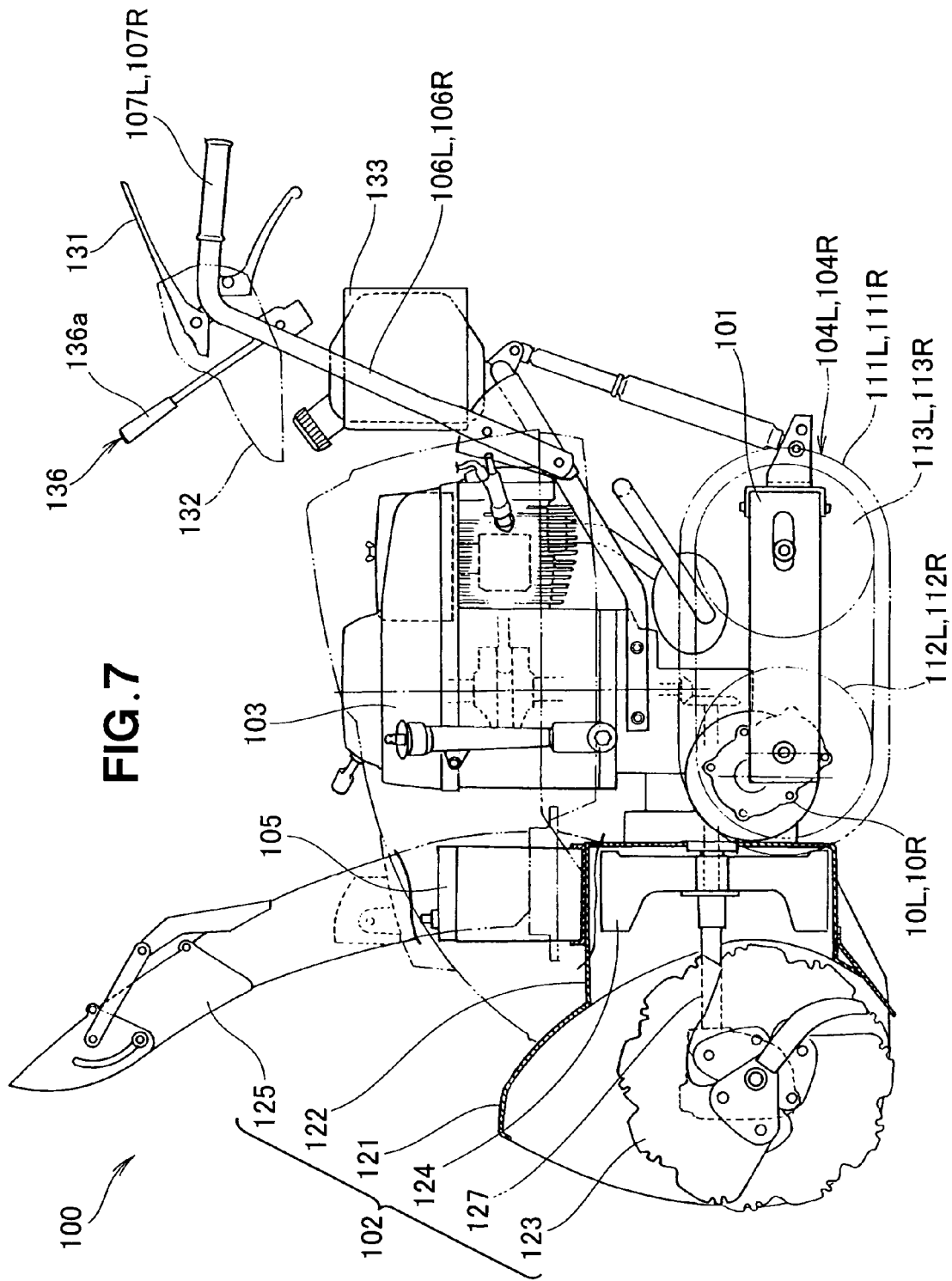
FIG. 7 is a side elevational view showing a self-propelled snow remover employing the electric motor of FIG. 1.
Figure 8:
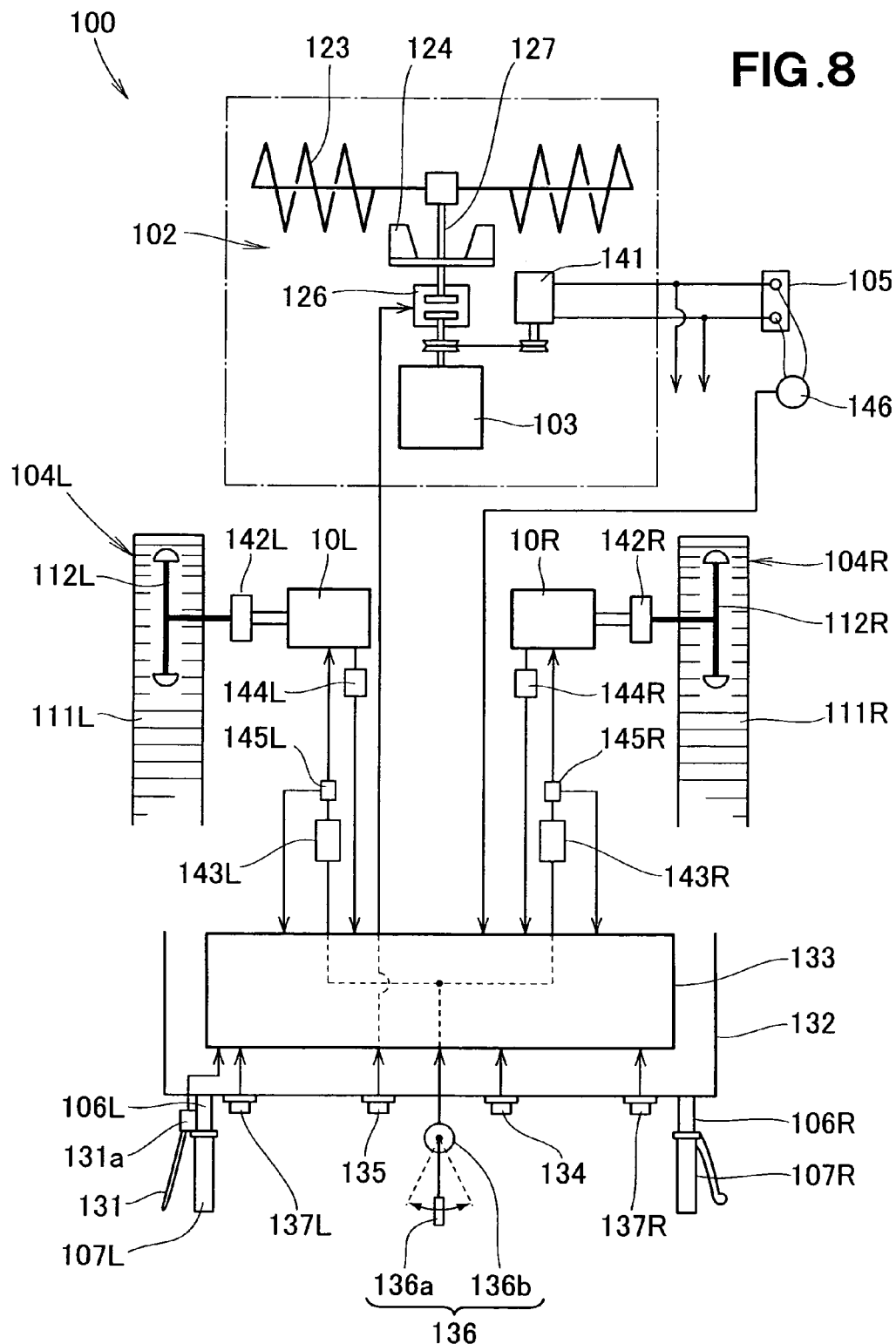
FIG. 8 is a schematic view showing a control system of the self-propelled snow remover shown in FIG. 7.

The chassis 101 of a self-propelled snow remover 100 has an auger-type snow removing implement 102; an engine 103 for driving the snow removing implement 102; crawler-type left and right travel units 104L, 104R; and left and right traveling electric motors 10L, 10R for driving the left and right travel units 104L, 104R, as shown in FIGS. 7 and 8.

The chassis 101 is provided with a battery 105 and left and right operation handles 106L, 106R that extend from the rear to the upper rearward area. The left and right operation handles 106L, 106R have grips 107L, 107R, respectively, at the distal ends thereof.

This type of self-propelled snow remover 100 rakes up snow using a front auger 123 while travelling in the forward direction to remove snow, and is therefore referred to as an auger-type snow remover. An operator can operate the self-propelled snow remover 100 by using the operation handles 106L, 106R while walking alongside the self-propelled snow remover 100.

The left and right travel units 104L, 104R are driven only by the traveling electric motors 10L, 10R, and are comprised of left and right crawler belts 111L, 111R, forwardly disposed left and right drive wheels (travel wheels) 112L, 112R, and rearwardly disposed left and right rolling wheels 113L, 113R. Torque generated by the left electric motor 10L drives the left crawler belt 111L via the left drive wheel 112L. Torque generated by the right electric motor 10R drives the right crawler belt 111R via the right drive wheel 112R.

The snow removing implement 102 is comprised of an auger housing 121, a blower case 122 formed integrally with the rear surface of the auger housing 121, an auger 123 provided to the auger housing 121, a blower 124 provided to the blower case 122, and a shooter 125.

The engine 103 is a snow removing drive source for driving the snow removing implement 102 via an electromagnetic clutch 126. The motive force of the engine 103 is transmitted to the auger 123 and the blower 124 via the electro-magnetic clutch 126 and an auger transmission shaft 127. Snow raked up by the auger is flung far away using the blower 124 via the shooter 125.

The left operation handle 106L is provided with a travel preparation lever 131. The travel preparation lever 131 is a member that acts on a switch 131a, and the switch 131a is off when brought into the free state shown in the drawing by the drawing action of the return spring. The switch 131a is switched on when the travel preparation lever 131 is grasped by the left hand of the operator.

An operation panel 132 and a controller 133 are disposed between the left and right operation handles 106L, 106R. The operation panel 132 is provided with a main switch 134, an auger switch 135, a forward/reverse speed operating part 136, and left- and right-turn operation switches 137L, 137R, as shown in FIG. 8.

The engine 103 can be started by turning the main switch 134 on. The auger switch 135 is a manually operated switch for switching the electromagnetic clutch 126 on and off, and is comprised of, e.g., a pushbutton switch.

The forward/reverse speed operating part 136 is an operating part for controlling the rotation of the left and right electric motors 10L, 10R, and is comprised of an operating lever 136a swingably operated forward and rearward, and a potentiometer 136b for sending an operating signal that corresponds to the swing distance of the operating lever 136a. The controller 133 controls the travel of the snow remover in the following manner in accordance with the operation of the forward/reverse speed operating part 136.

When the operating lever 136a is in a neutral position, the rotation of the left and right electric motors 10L, 10R is stopped, whereby the left and right travel units 104L, 104R are stopped. When the operating lever 136a is swung forward from the neutral position, the left and right electric motors 10L, 10R are normally rotated, whereby the left and right travel units 104L, 104R are made to travel forward. When the operating lever 136a is swung rearward from the neutral position, the left and right electric motors 10L, 10R are rotated in reverse, whereby the left and right travel units 104L, 104R are made to travel in reverse. The travel speed of the left and right travel units 104L, 104R is controlled by controlling the rotational speed of the left and right electric motors 10L, 10R in accordance with the swing distance of the operating lever 136a. In this manner, the forward/rearward direction and the high- and low-speed control are set by a single operating lever 136a.

Left- and right-turn operation switches 137L, 137R are comprised of pushbutton switches, and are contact automatic return-type switches in which the switch is on only during the interval that the button is being pressed and a switch signal is sent.

Next, the control system of the self-propelled snow remover 100 will be described with reference to FIG. 8. The control system of the electric motor 10 is consolidated around the controller 133. The controller 133 houses a memory and performs control by reading as needed various information stored in the memory.

A power generator 141 is rotated using a portion of the output of the engine 103; the power thus obtained is supplied to the battery 105, and is also supplied to the left and right electric motors 10L, 10R and other electrical components. The remaining portion of the output of the engine 103 is applied to the rotation of the auger 123 and the blower 124.

The battery 105 supplies power to the left and right electric motors 10L, 10R and other electrical components. Accordingly, the left and right electric motors 10L, 10R are driven and the self-propelled snow remover 100 can be made to travel even if the engine 103 is stopped.

The travel preparation lever 131 is grasped and the auger switch 135 is turned on, whereby the electromagnetic clutch 126 is engaged (switched on) and the auger 123 and the blower 124 are rotated by the motive force of the engine 103. When the auger switch 135 is switched off, the electromagnetic clutch 126 is disengaged (switched off).

The electromagnetic clutch 126 can be disengaged by placing the travel preparation lever 131 in a free state or by switching off the auger switch 135.

The travel system will be described next.

The self-propelled snow remover 100 is provided with left and right electromagnetic brakes 142L, 142R, which correspond to a parking brake of an ordinary vehicle. The electromagnetic brakes 142L, 142R are brought into a braked stated (on state) by the control action of the controller 133 when the snow remover is parked.

The controller 133, which has obtained the position information of the operating lever 136a of the forward/reverse speed operating part 136 from the potentiometer 136b, sends a control signal to the left and right driver circuits 143L, 143R; required drive current is supplied to the left and right electric motors 10L, 10R; and the left and right electric motors 10L, 10R are rotated.

The controller 133 detects the speed of the electric motors 10L, 10R by using motor rotation sensors 144L and 144R, and performs feedback control so that the speed reaches a predetermined value on the basis of the detection signal. As a result, the left and right drive wheels 112L, 112R rotate at a predetermined speed in the desired direction and enter a travelling state.

The drive control method of the left and right electric motors 10L, 10R may be, e.g., a pulse width modulation method (PWM method) that supplies pulse voltage to a motor terminal. In the case of the PWM method, the driver circuits 143L, 143R send pulse signals having controlled pulse widths in accordance with the control signal of the controller 133 to control the rotation of the electric motors 10L, 10R.

The drive current supplied individually from the left and right driver circuits 143L, 143R to the left and right electric motors 10L, 10R is detected by electric current sensors 145L, 145R.

The voltage (voltage between terminals) of the battery 105 is detected by a battery voltage sensor 146.

Braking during travel is carried out in the following manner. The left and right driver circuits 143L, 143R include a regenerative brake circuit. The electric motor is rotated by supplying electric energy from the battery to the electric motor. The power generator is also provided as means for converting rotation into electrical energy. In the present invention, therefore, the electric motor is changed into a generator and made to produce power by electrical switching. Electrical energy can be stored in the battery when the power voltage is higher than the battery voltage. This is the working principle of a regenerative brake.

While the left-turn operation switch 137L is being pressed, the controller 133 actuates the left regenerative brake circuit on the basis of the ON signal and reduces the speed of the left electric motor 10L. While the right-turn operation switch 137R is being pressed, the controller 133 actuates the right regenerative brake circuit on the basis of the ON signal and reduces the speed of the right electric motor 10R. In other words, the self-propelled snow remover 100 turns left only while the left-turn operation switch 137L is being pressed. The self-propelled snow remover 100 turns right only while the right-turn operation switch 137R is being pressed.

Next, the particular relationship between the controller 133, the left driver circuit 143L, and the left electric motor 10L in the control system of the self-propelled snow remover 100 shown in FIG. 8 will be described in detail with reference to FIG. 9. The relationship between the right driver circuit 143R and the right electric motor 10R is the same and a description is therefore omitted.

Figure 9:
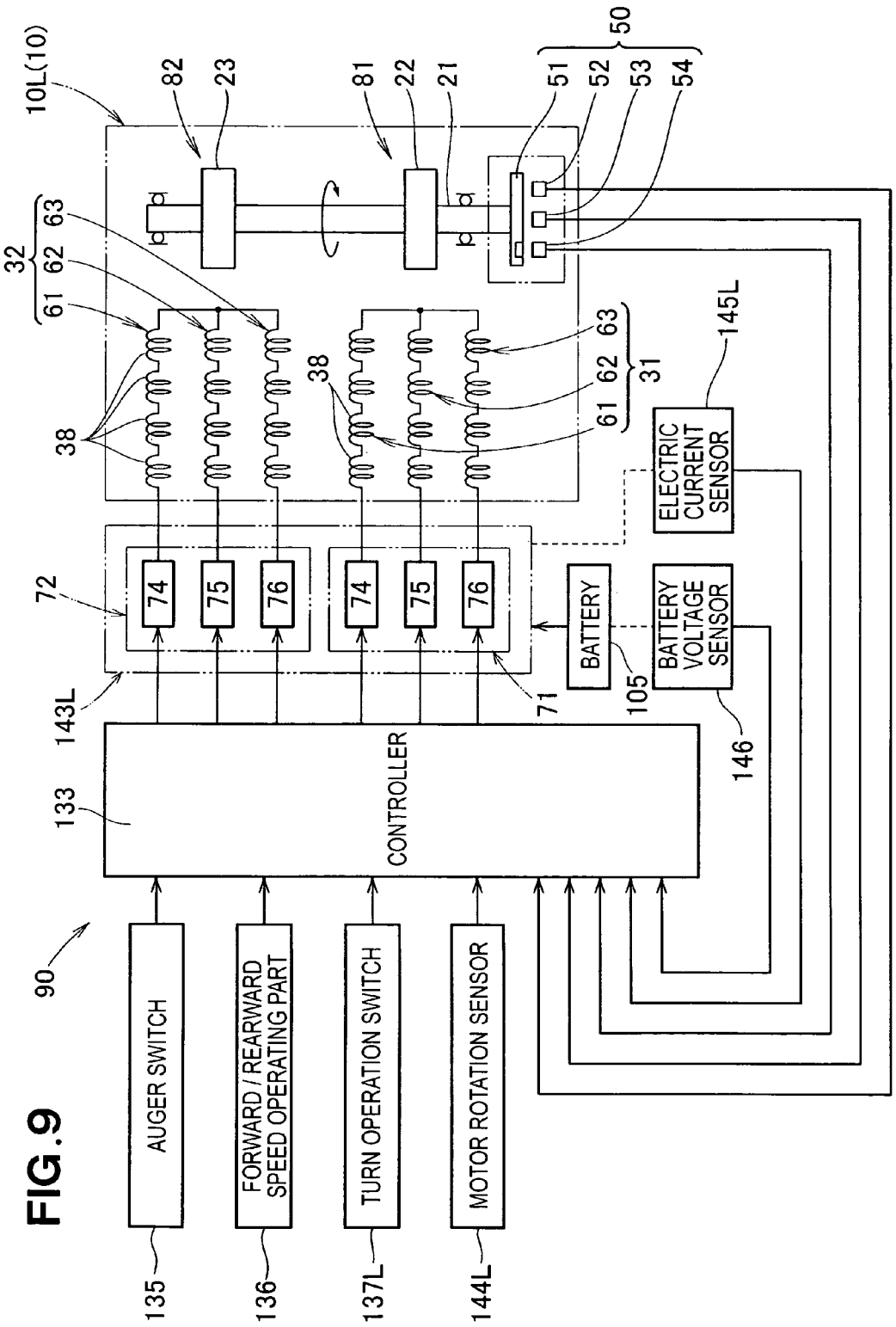
FIG. 9 is a circuit diagram showing a relationship between a controller, a left driver circuit and a left electric motor of the control system of the self-propelled snow remover shown in FIG. 8.

The left electric motor 10L (i.e., the electric motor 10 shown in FIG. 1) has 12 windings 38 for each stator 31 and 32, as shown in FIG. 9. A plurality of winding phases 61 to 63 is constituted by connecting the 12 windings 38 in series of, e.g., groups of four mutually adjacent windings. Specifically, the three phases are a U winding phase 61, a V winding phase 62, and a W winding phase 63. The winding phases 61 to 63 are arranged in the peripheral direction of the stators 31, 32. In this manner, the winding phases 61 to 63 is an assembly of the windings 38. The winding phases 61 to 63 are set in a Y connection (star connection) by connecting one end of each to each other. In this manner, the stators 31, 32 has electrically independent windings 38 for each of the stators 31, 32.

The left driver circuit 143L is comprised of a first driver circuit 71 for supplying drive current to the winding phases 61 to 63 of the first stator 31, and a second driver circuit 72 for supplying drive current to the winding phases 61 to 63 of the second stator 32. The first driver circuit 71 is comprised of three mutually independent phase drivers, i.e., a U-phase driver 74, a V-phase driver 75, and a W-phase driver 76. The same applies to the second driver circuit 72.

A configuration comprised of a combination of the first rotor 22 and the first stator 31 is referred to as a first motor unit 81. A configuration comprised of a combination of the second rotor 23 and the second stator 32 is referred to as a second motor unit 82.

A configuration comprised of a combination of the electric motor 10, the left driver circuit 143L for supplying drive current to the electric motor 10, and the controller 133 for controlling the left driver circuit 143L is referred to as a power apparatus 90.

Figure 10:
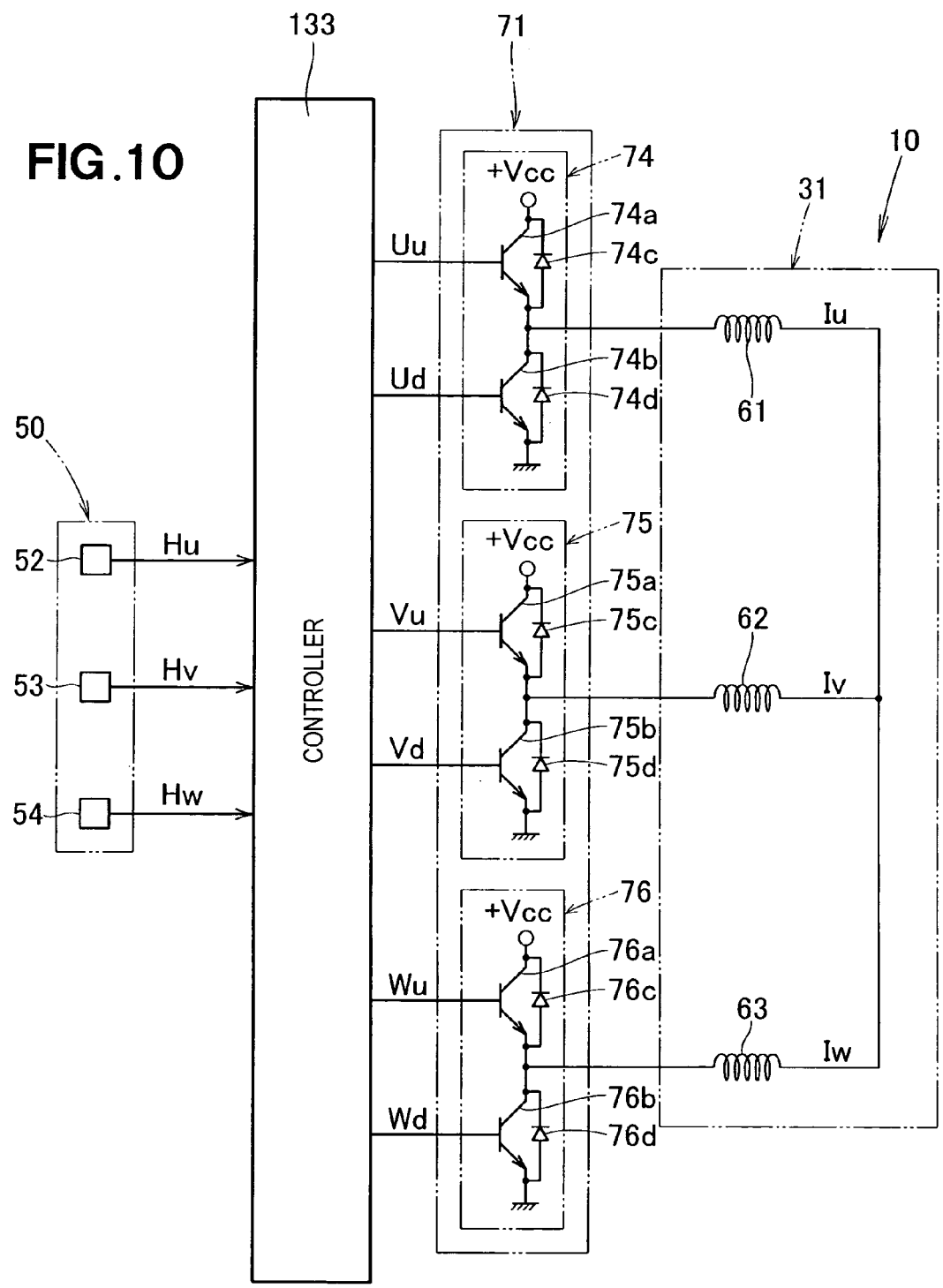
FIG. 10 is an electric circuit diagram showing details of the driver circuit of FIG. 9.

Next, the particular relationship between the controller 133, the first driver circuit 71, and the first stator 31 in the circuit shown in FIG. 9 will be described with reference to FIG. 10. The same applies to the second driver circuit 72 and the second stator 32, and a description is therefore omitted. In FIG. 10, +Vcc is a positive pole of the battery 105.

In the first driver circuit 71, the three phase drivers 74 to 76 have the same configuration, as shown in FIG. 10. In other words, the U-phase driver 74 is comprised of, e.g., an upper element 74a and a lower element 74b connected in series, and a half-bridge circuit in which the connection points of the upper and lower elements are connected to the U winding phase 61. The U-phase driver 74 has two electric current regeneration diodes 74c and 74d.

The V-phase driver 75 is comprised of, e.g., an upper element 75a and a lower element 75b connected in series, and a half-bridge circuit in which the connection points of the upper and lower elements are connected to the V winding phase 62. The V-phase driver 75 has two electric current regeneration diodes 75c, 75d.

The W-phase driver 76 is comprised of, e.g., an upper element 76a and a lower element 76b connected in series, and a half-bridge circuit in which the connection points of the upper and lower elements are connected to the W winding phase 63. The W-phase driver 76 has two electric current regeneration diodes 76c, 75d.

The drivers 71, 72 are not limited to a half-bridge circuit, and an H-bridge circuit may be used, for example. The upper elements 74a, 75a, 76a and the lower elements 74b, 75b, 76b are comprised of, e.g., transistors.

Next, the torque ripple generated by the electric motor 10 will be described.

First, the torque generated by the first motor unit 81, i.e., the torque generated in the first winding will be described based on FIG. 11 while also referring to FIG. 10.

Figure 11:
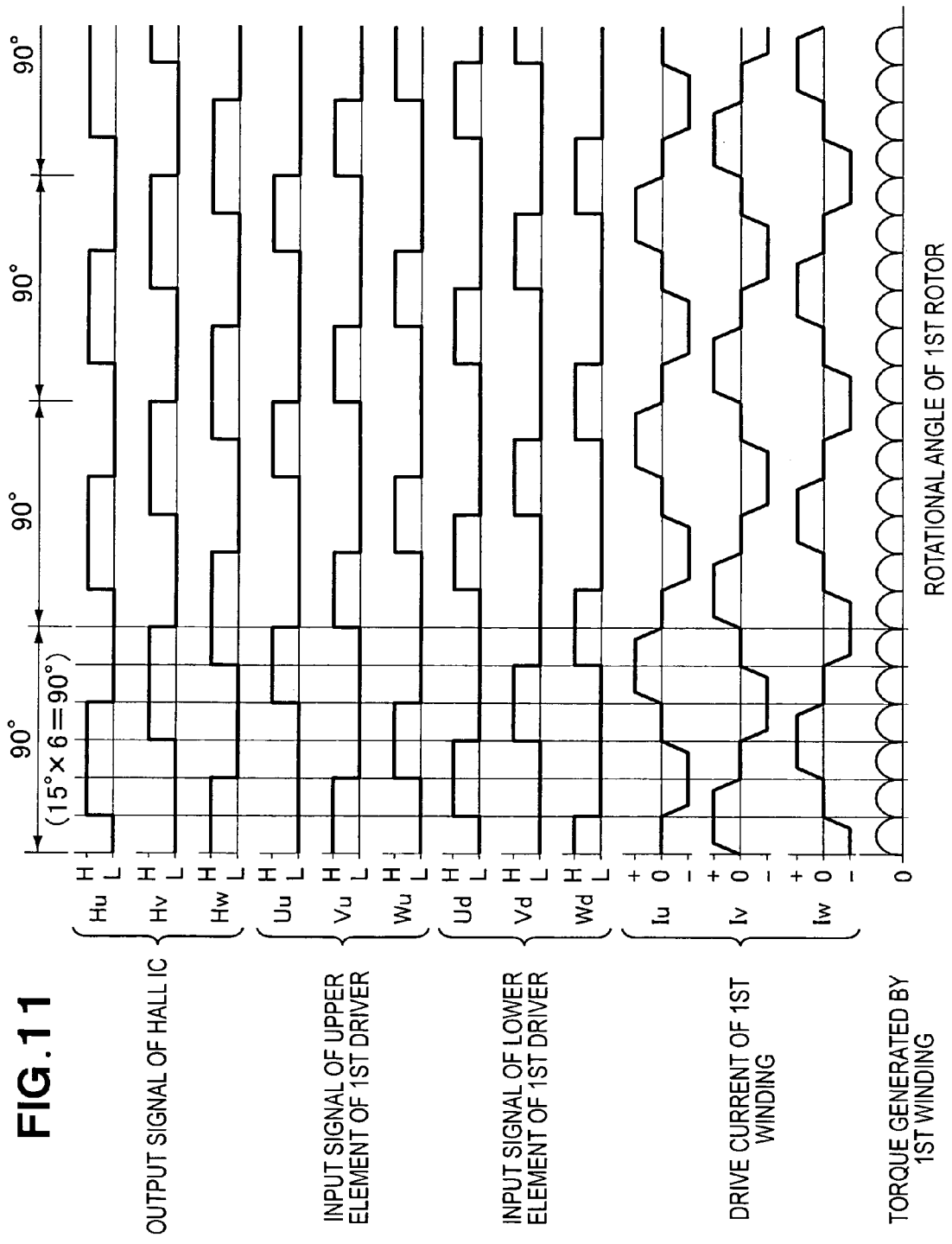
FIG. 11 is a diagrammatical view showing characteristics of a first winding of FIG. 10.

FIG. 11 shows the characteristics of a first winding (first motor unit 81). The horizontal axis is the rotational angle of the first rotor, and the vertical axis is the signal and torque of each part.

The first stator 31 has 12 windings 38. Accordingly, the current of all 12 windings 38 is switched 24 times. In other words, the current of the 12 windings 38 switches every 15° of rotation of the first rotor 22. In FIG. 11, the rotational angle of the first rotor 22 shows the characteristics of each part in increments of 15°.

Hu is an output signal of a first Hall IC (detection element) 52 in the phase detecting sensor 50, Hv is an output signal of a second Hall IC (detection element) 53, and Hw is an output signal of a third Hall IC (detection element) 54.

Uu is an input signal of the upper element 74a in the first driver circuit 71, Vu is an input signal of the upper element 75a, Wu is an input signal of the upper element 76a, Ud is an input signal of the lower element 74b, Vd is an input signal of the lower element 75b, and Wd is an input signal of the lower element 76b.

In the first winding, Iu is a drive current supplied to the U winding phase 61, Iv is a drive current supplied to the V winding phase 62, and Iw is a drive current supplied to the W winding phase 63.

H is a high level signal and L is low level signal. In the drive current, + is positive current and − is negative current.

The waveform of the output signal generated by the three Hall ICs 52 to 54 is offset in phase by 30° in terms of the rotational angle of the first rotor 22, as shown in FIG. 11. Accordingly, the waveform of the drive current supplied to the three winding phases 61 to 63 is offset in phase by 30° in terms of the rotational angle of the first rotor 22. As a result, it is apparent that the first rotor 22 in the first winding generates torque every 15° of rotational angle. In this situation, the peak value of the torque generated by the first rotor 22 is relatively high.

Torque ripple is preferably reduced in order to reduce vibrations of the electric motor 10 and to output torque with good efficiency from the electric motor 10.

Next, the combined torque composed the torque generated by the first rotor 22 in the first winding (first motor unit 81) and the torque generated by the second rotor 23 in the second winding (second motor unit 82) will be described based on FIG. 12 while referring FIGS. 4 and 6.

In the electric motor 10, the phases of the first and second rotors 22, 23 are mutually offset by an angle θ2, and the phases of the first and second stators 31, 32 match each other. Alternatively, in the electric motor 10, the phases of the first and second rotors 22, 23 match each other, and the phases of the first and second stators 31, 32 are mutually offset by an angle θ2.

The value of θ2 is set to 7.5° because the electric current of the 12 windings 38 switches every 15° rotation of the first rotor 22. The results are shown in FIG. 12.

Figure 12:
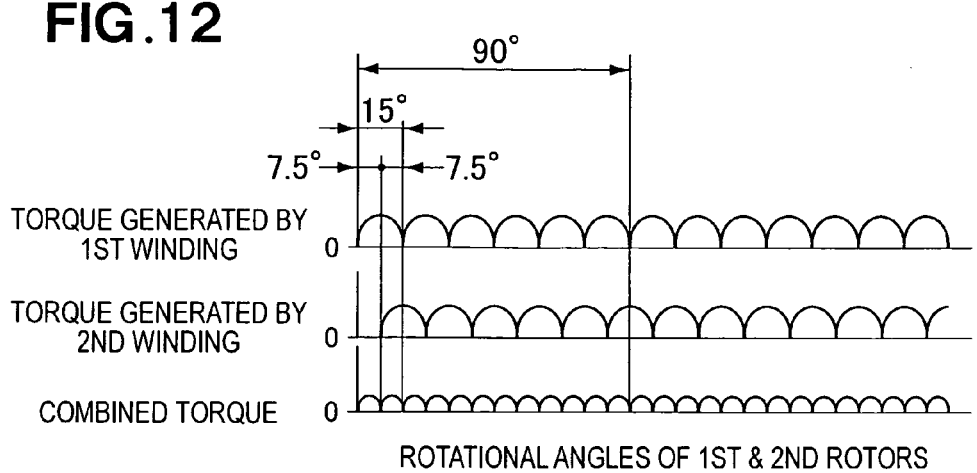
FIG. 12 is a diagrammatical view showing characteristics of the combined torque of the electric motor of FIG. 1.

FIG. 12 is a torque characteristics diagram showing the combined torque. The horizontal axis is the rotational angle of the first and second rotors, and the vertical axis is generated torque.

In accordance with FIG. 12, it is apparent that the first winding generates torque, after which the second winding generates torques when the first and second rotors 22, 23 have rotated through an angle θ2 (where θ2=7.5°). In other words, the timing for generating torque is offset between the first winding and the second winding. As a result, the combined torque (the entire torque produced by the electric motor 10) of the torque generated by the first winding and the torque generated by the second winding is produced every rotational angle θ2.

As a result, the phase of the torque ripple generated by each of the motor units 81, 82, which are comprised of a combination of a single rotor and a single stator, can be offset in phase. Accordingly, the entire torque ripple of the electric motor 10 can be easily reduced. In other words, the torque produced by the electric motor 10 can be smoothed. Additionally, torque ripple is reduced in a simple configuration in which a plurality of rotors 22, 23 disposed with mutually offset phases is secured to a single motor shaft 21, or a plurality of stators 31, 32 is mutually offset in phase.

Next, the control flow for a case in which the controller 133 shown in FIGS. 8 and 9 described above is a microcomputer will be described based on FIGS. 13 and 14 while making reference to FIG. 9.

In the case of the control flow structure shown in FIGS. 13 and 14, the electric motor 10 is configured in the following manner. Specifically, the rotors 22, 23 are disposed with mutually matching phases, and the stators 31, 32 are also disposed with mutually matching phases.

These control flows start when, e.g., a main switch 134 is switched on. In the diagrams, STxx indicates a step number. Step numbers that are not described in any particular way progress in sequence.

The control flows described below describe the particular relationship between the controller 133, the left driver circuit 143L, and the left electric motor 10L. The same applies to the right driver circuit 143R and the right electric motor 10R, and a description is therefore omitted.

Figure 13:
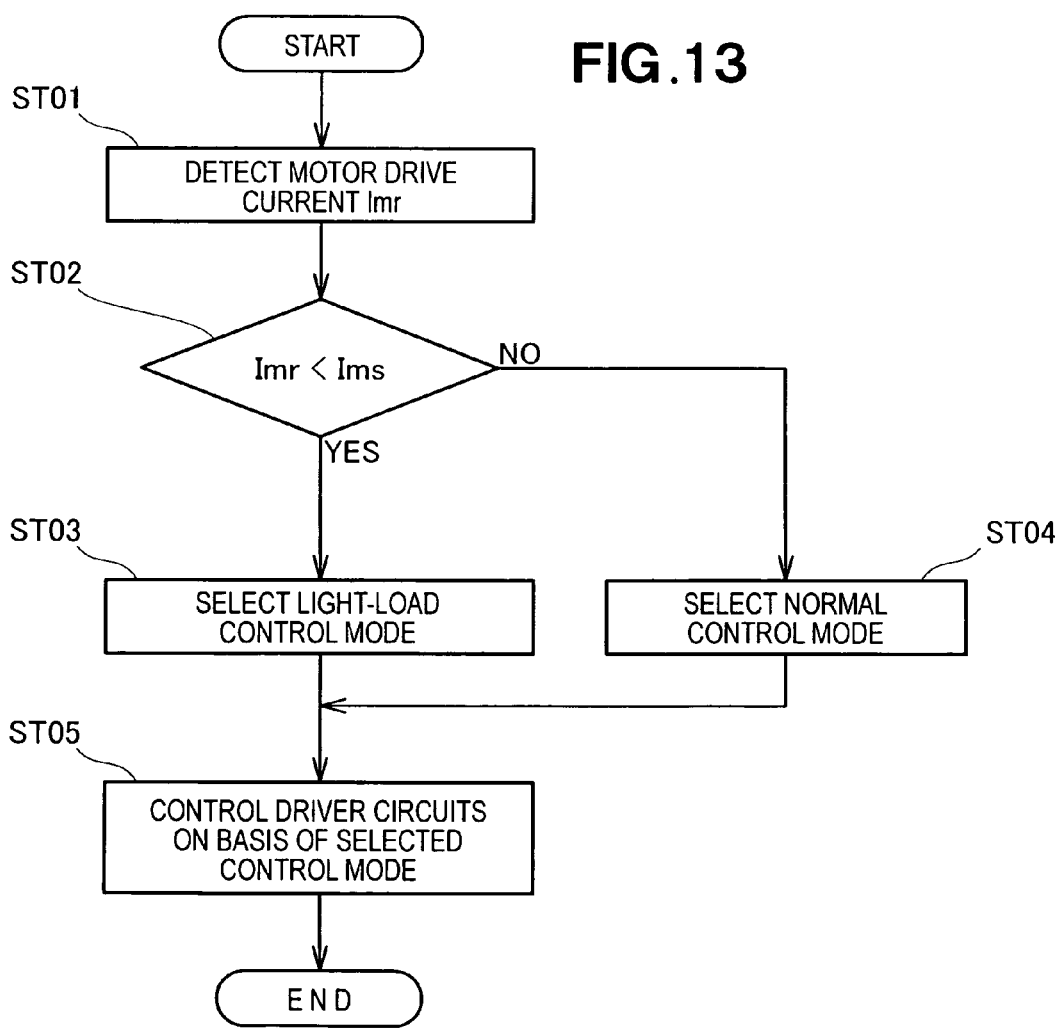
FIG. 13 is a flowchart of control of the controller shown in FIG. 9, according to a first embodiment of the present invention.

FIG. 13 is a control flowchart (first embodiment) of the controller shown according to the present invention.

ST01: The drive current Imr supplied from the driver circuit 143L to the electric motor 10L is detected by the electric current sensor 145L ST02: A determination is made whether the driver current Imr is less than a predetermined reference current Ims set in advance. If YES, the process proceeds to ST03, and if NO, the process proceeds to ST04. At this point, the reference current Ims is the required drive current supplied when the self-propelled snow remover 100 is made to travel without removing snow by the snow removing implement 102.

ST03: Since the determination is YES, a light-load control mode is selected from among a plurality of control modes stored in the controller 133. The light-load control mode is a control mode for controlling the driver circuit 143L so as to supply drive current only to a predetermined winding 38 in the windings 38. For example, the drive current is supplied to only the windings 38 in one of the stators among the first and second stators 31, 32.

ST04: Since the determination is NO, a normal control mode is selected from among the control modes stored in the controller 133. The normal control mode is a control mode for controlling the driver circuit 143L so as to supply drive current to all of the windings 38.

ST05: The driver circuit 143L is controlled based on the control mode selected in ST03 or ST04, and control in the control flow is thereafter ended.

In this manner, in the first embodiment shown in FIG. 13, the load on the electric motors 10L, 10R is small when the self-propelled snow remover 100 is made to travel without removing snow by the snow removing implement 102. As a result, the drive current Imr supplied to the electric motors 10L, 10R is less than the reference current Ims.

The controller 133 for performing the control of the control flowchart shown in FIG. 13 controls (ST03 and ST05) the driver circuits 71, 72 so that drive current is supplied only to predetermined windings 38 in the windings 38 when it has been determined (ST02) that a condition has been satisfied that the drive current Imr supplied to the electric motor 10L is less than the predetermined reference current Ims. As a result, the torque generated by the electric motors 10L, 10R is low.

On the other hand, the load on the electric motors 10L, 10R is high when the self-propelled snow remover 100 is made to travel while removing snow by the snow removing implement 102. As a result, the drive current Imr supplied to the electric motors 10L, 10R reaches the reference current Ims. At this point, the controller 133 can perform control (ST04 and ST05) so as to supply drive current to all of the windings 38, for example. As a result, the torque generated by the electric motors 10L, 10R is high. Also, the electric motors 10L, 10R can be rotated at low speed in accordance with the speed set by the operator.

In this manner, the power consumption of the electric motors 10L, 10R can be reduced using a simple configuration because the supply of drive current to the electric motors 10L, 10R is merely changed depending on whether snow is being removed by the snow removing implement 102.

The electric motor 10 is comprised of a single motor shaft 21, a plurality of rotors 22, 23, and a plurality of stators 31, 32. The windings 38 of the stators 31, 32 are electrically independent in each of the stators 31, 32. The driver circuits 71, 72 are divided into a plurality of units so as to individually supply drive current to the windings 38 of the stators 31, 32. The controller 133 can control a plurality of driver circuits 71, 72. Accordingly, the electric current supply capacity of the driver circuits 71, 72 is kept low. The driver circuits 71, 72 can be made smaller.

The driver circuits 71, 72 produce heat. In response to this situation, the driver circuits 71, 72 are divided into a plurality of units, and the heat radiated from the driver circuits 71, 72 can therefore be dispersed. Accordingly, a heat sink for cooling the driver circuits 71, 72 can be made smaller, and the power apparatus 90 can be reduced in size.

Since the driver circuits 71, 72 are divided into a plurality of units, the controller 133 can individually control the driver circuits 71, 72 in accordance with fluctuations of the load on the electric motor 10. In other words, drive current is supplied only to the required windings 38. As a result, wasted power consumption (drive current) by the electric motor 10 can be easily reduced, and energy savings can be promoted. Also, the power apparatus 90 is provided with a simple configuration.

Figure 14:
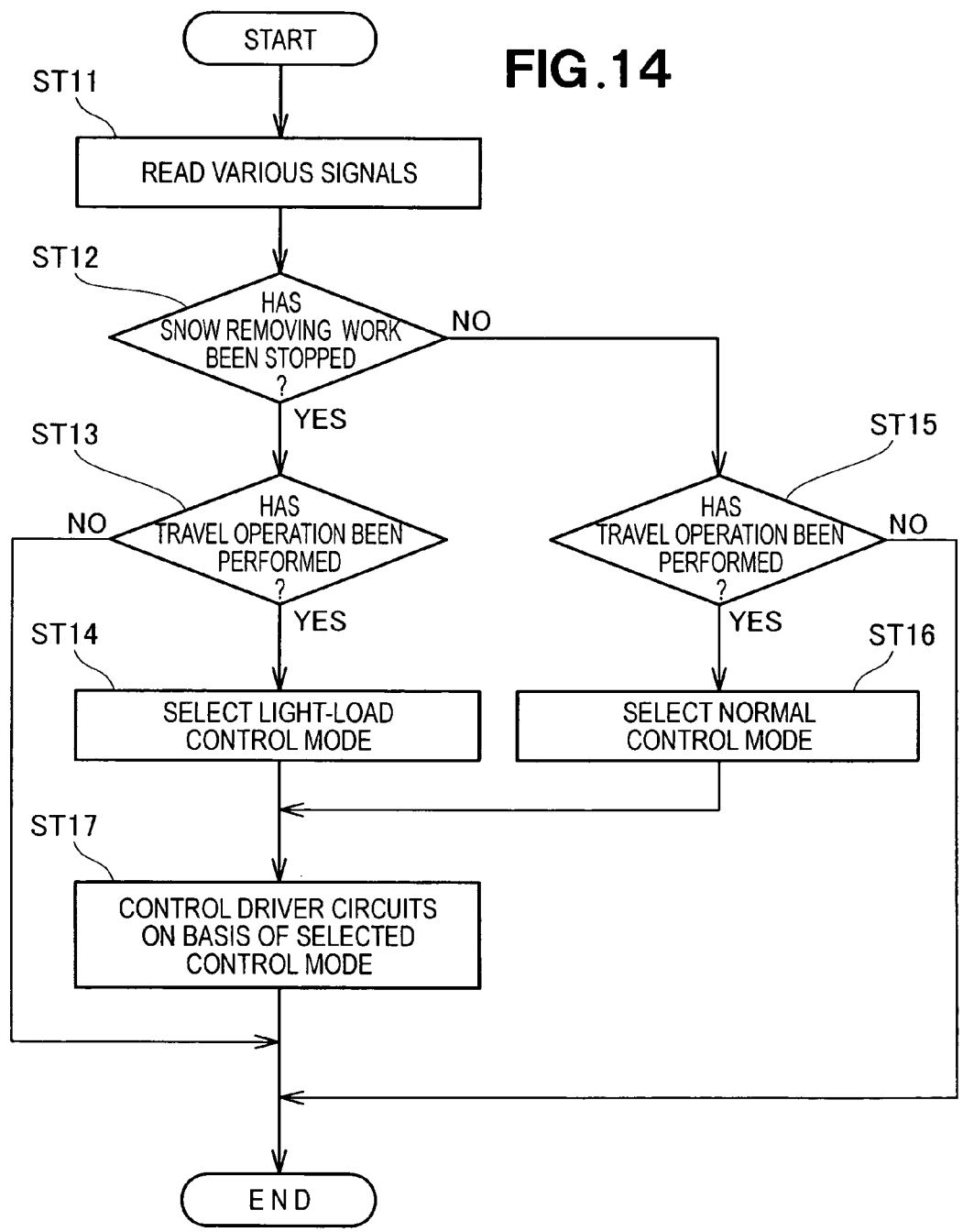
FIG. 14 is a flowchart of control of the controller shown in FIG. 9, according to a second embodiment of the present invention.

FIG. 14 is a control flowchart (second embodiment) of the controller according to the present invention.

ST11: Various signals are read.

ST12: It is determined whether the snow removal operation is stopped. If YES, the process proceeds to ST13, and if NO, the process proceeds to ST15. For example, it is determined that the snow removal operation is stopped when the auger switch 135 is off.

ST13: A determination is made whether the vehicle is traveling. If YES, the process proceeds to ST14, and if NO, control in the control flow is ended. For example, it is determined that the vehicle is set in motion when the operating lever 136a has been swung forward or rearward (when tilted).

ST14: A light-load control mode is selected from among a plurality of control modes stored in the controller 133. The light-load control mode is a control mode for controlling the driver circuit 143L so as to supply drive current only to a predetermined winding 38 in the windings 38. For example, drive current is supplied only to the windings 38 in one of the stators among the first and second stators 31, 32.

ST15: A determination is made whether a travel operation has been performed. If YES, the process proceeds to ST16, and if NO, control in the control flow is thereafter ended.

ST16: Normal control mode is selected from among the control modes stored in the controller 133. The normal control mode is a control mode for controlling the driver circuit 143L so as to supply drive current to all of the windings 38.

ST17: The driver circuit 143L is controlled based on the control mode selected in ST14 or ST16, and control in the control flow is thereafter ended.

In this manner, in the second embodiment shown in FIG. 14, the load on the electric motors 10L, 10R is small when the self-propelled snow remover 100 is made to travel without removing snow by the snow removing implement 102. As a result, the drive current Imr supplied to the electric motors 10L, 10R is less than the reference current Ims.

The controller 133 for performing the control procedures of the control flowchart shown in FIG. 14 controls (ST14 and ST17) the driver circuits 71, 72 so that drive current is supplied only to predetermined windings 38 in the windings 38 when two conditions are determined to have been satisfied: a condition (ST12) that snow removal using the snow removing implement 102 is stopped, and a condition (ST13) that the travel devices 111L, 111R are being operated. As a result, the torque generated by the electric motors 10L, 10R is low.

On the other hand, the load on the electric motors 10L, 10R is high when the self-propelled snow remover 100 is made to travel while removing snow by the snow removing implement 102. As a result, a drive current Imr supplied to the electric motors 10L, 10R reaches a reference current Ims. In this case, the controller 133 can perform control (ST16 and ST17) so as to supply drive current to all of the windings 38, for example. As a result, the torque generated by the electric motors 10L, 10R is high. Also, the electric motors 10L, 10R can be rotated at low speed in accordance with the speed set by the operator.

In this manner, the power consumption of the electric motors 10L, 10R can be reduced using a simple configuration because the supply of drive current to the electric motors 10L, 10R is merely changed depending on whether snow is being removed by the snow removing implement 102.

Since the driver circuits 71, 72 are divided into a plurality of units, the controller 133 can individually control the driver circuits 71, 72 in accordance with fluctuations in the load on the electric motor 10. In other words, drive current is supplied only to required windings 38. As a result, wasted power consumption (drive current) by the electric motor 10 can be easily reduced, and energy savings can be promoted. Also, the power apparatus 90 is provided with a simple configuration.

Next, a modified example of the traveling electric motor 10, the controller 133, and the driver circuit 143L will be described with reference to FIGS. 15 to 20. The same reference numerals are used for the same configuration as the controller 133 and the driver circuit 143L shown in FIGS. 1 to 14, and a description thereof is omitted.

Figure 15:
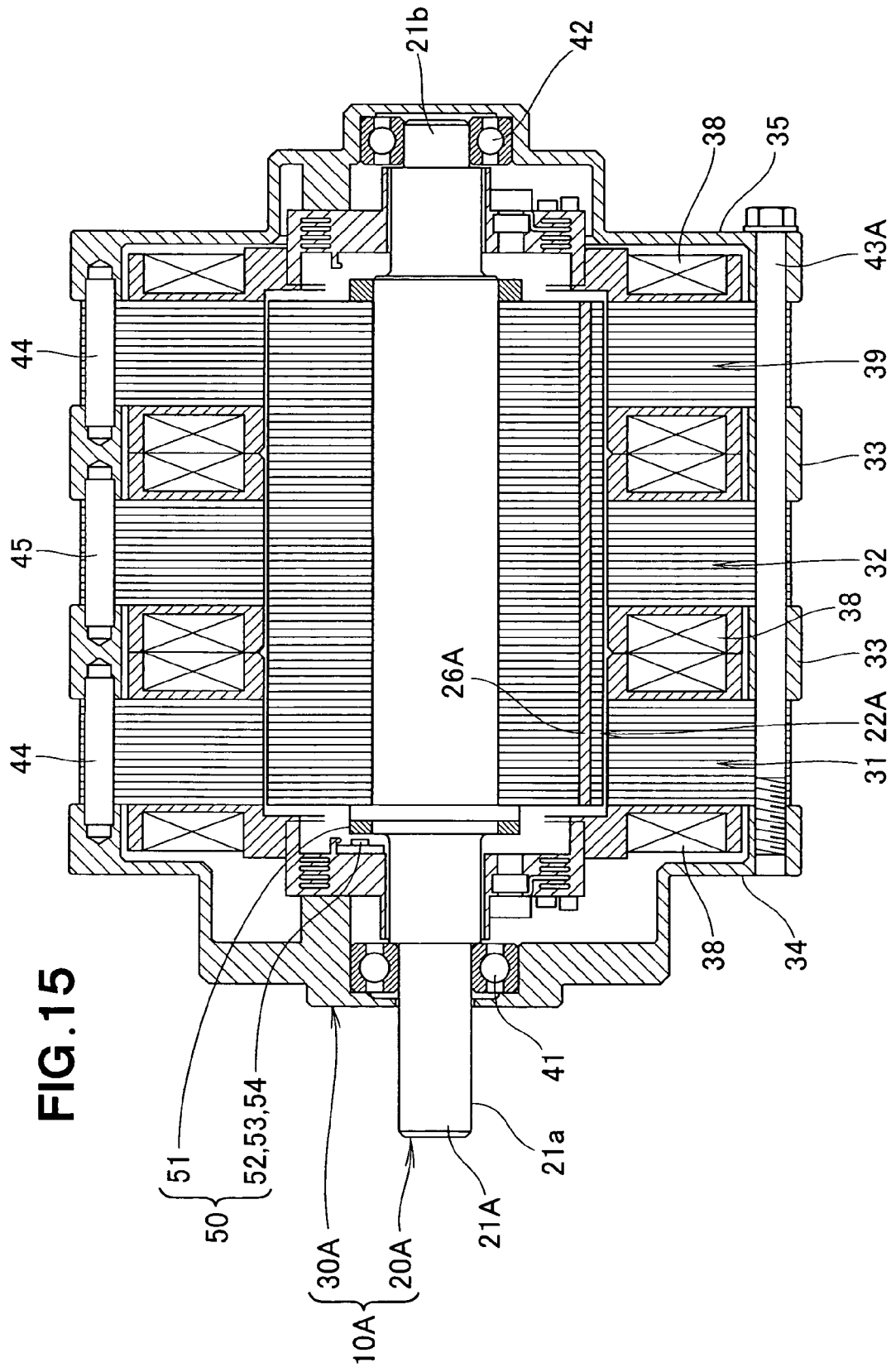
FIG. 15 is a view showing a modification of the traveling electric motor shown in FIG. 1.

FIG. 15 is a cross-sectional view of the traveling electric motor according to a modified example of the present invention, and is presented in conformity with FIG. 1. The traveling electric motor 10A according to the modified example is comprised of a rotor block 20A and a stator block 30A, and is a brushless inner-rotor DC motor.

The rotor block 20A is comprised of a single motor shaft 21A and a single rotor 22A. The rotor 22A is an annular member secured by, e.g., press-fitting to the motor shaft 21A, and has substantially the same configuration as the first rotor 22 in FIGS. 1 to 4. However, the rotor 22A has a narrower configuration than the first rotor 22 so as to allow all of the stators 31, 32, 39 to be accommodated. Accordingly, the length of a plurality of permanent magnets 26A is increased in accordance with the length of the rotor 22A.

Next, the stator block 30A will be described. The stator block 30A is comprised of stators 31, 32, 39 divided into a plurality (three) of members in the axial direction of the motor shaft 21A, two inter-stator spacers 33 and 33, and two covers 34, 35. The three stators 31, 32, 39 are annular outer stators disposed so as to individually correspond to the signal rotor 22A. The three stators 31, 32, 39 are disposed with mutually matching phases.

The rotor 22A and the stators 31, 32, 39 are concentrically disposed in relation to the motor shaft 21A. The rotor 22A is disposed at a slight gap (air gap) inside the corresponding stators 31, 32, 39.

In this manner, the electric motor 10A of the modified example is a brushless inner-rotor DC motor comprised of a single motor shaft 21A, a single rotor 22A provided to the motor shaft 21A, and three stators 31, 32, 39 arranged in the axial direction of the motor in correspondence with the rotor 22A.

The rotor block 20A has a single rotor 22A, but otherwise has substantially the same configuration as the rotor block 20 shown in FIGS. 1 to 4.

The stator block 30A has the first and second stators 31, 32 described above, and additionally has a third stator 39, but otherwise has substantially the same configuration as the stator block 30 shown in FIGS. 1 to 4.

Next, the relationship between the controller 133, the left driver circuit 143L, and the left electric motor 10A in a modified example will be described in detail with reference to FIG. 16.

Figure 16:
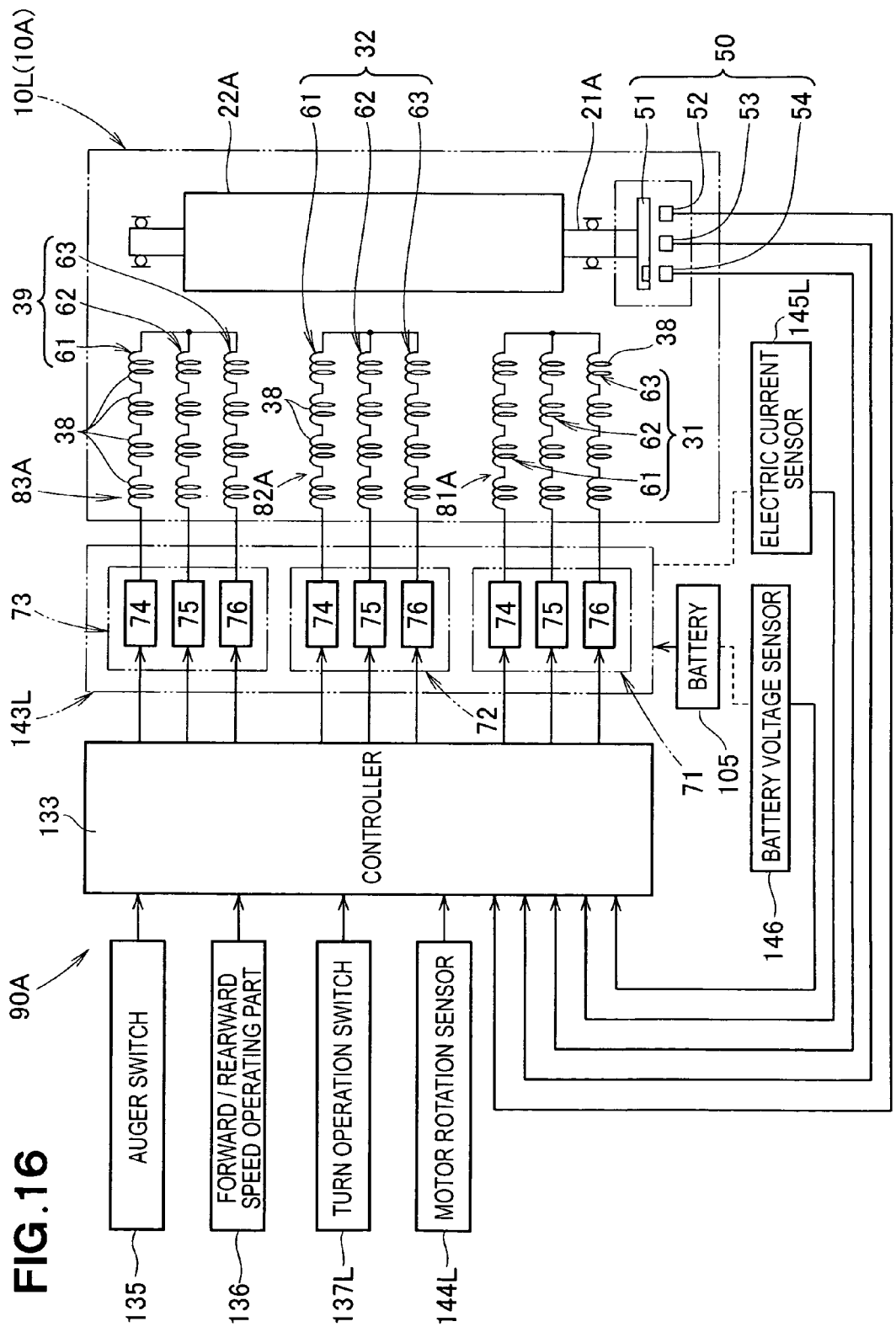
FIG. 16 is a circuit diagram of the modification of the power apparatus shown in FIG. 15.

A configuration comprised of a combination of the rotor 22A and the first stator 31 is referred to as a first motor unit 81A, as shown in FIG. 16. A configuration comprised of a combination of the rotor 22A and the second stator 32 is referred to as a second motor unit 82A. A configuration comprised of a combination of the rotor 22A and the third stator 39 is referred to as a motor unit 83A.

A configuration comprised of a combination of the electric motor 10A, the driver circuit 143L for supplying drive current to the electric motor 10A, and the controller 133 for controlling the driver circuit 143L is referred to as a power apparatus 90A.

The electric motor 10A has 12 windings 38 for each of the stators 31, 32, 39. A plurality of winding phases 61 to 63 are constituted by connecting the 12 windings 38 in series in, e.g., groups of four mutually adjacent windings. Specifically, the three phases are a U winding phase 61, a V winding phase 62, and a W winding phase 63. The winding phases 61 to 63 are arranged in the peripheral direction of the stators 31, 32, 39. In this manner, the winding phases 61 to 63 is an assembly of the windings 38, and the windings are electrically independent from each other. The winding phases 61 to 63 are arranged in a Y connection (star connection) by connecting one end of each to each other.

The driver circuit 143L of the modified example has a first driver circuit 71 and a second driver circuit 72, and additionally has a third driver circuit 73. The third driver circuit 73 is comprised of three phase drivers: a U-phase driver 74, a V-phase driver 75, and a W-phase driver 76 that are mutually independent in the same manner as the first driver circuit 71. In other words, the third driver circuit 73 has substantially the same configuration as the first driver circuit 71.

Next, the control flow for a case in which the controller 133 shown in FIG. 16 described above is a microcomputer will be described based on FIG. 17 while making reference to FIG. 16. The control flow is started when, e.g., the main switch 134 (see FIG. 8) is switched on. In the case of the control flow structure shown in FIG. 17, the electric motor 10A is configured in the following manner. In other words, the stators 31, 32, 39 are disposed with mutually matching phases.

Figure 17:
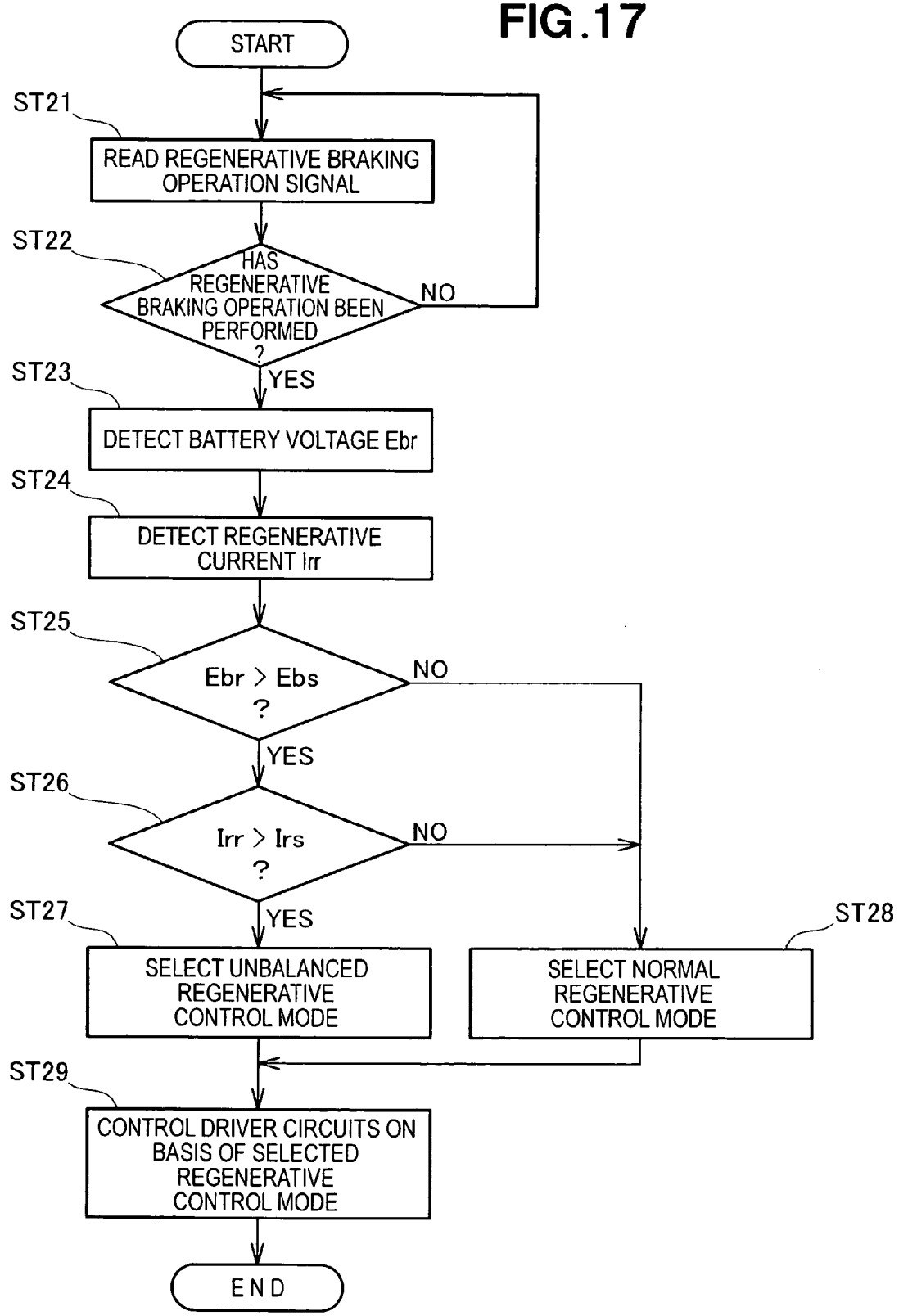
FIG. 17 is a control flowchart of the controller of FIG. 16.

FIG. 17 is a control flowchart of the controller of a modified example.

ST21: The operation signals of regenerative braking, i.e., the switch signals of the left- and right-turn operating switches 137L, 137R are read.

ST22: A determination is made as to whether a regenerative braking operation has been performed. If YES, the process proceeds to ST23, and if NO, the process returns to ST21. A determination is made that a regenerative braking operation has been performed when the left-turn operating switch 137L or the right-turn operating switch 137R has been switched on.

ST23: The voltage Ebr of the battery 105 is detected by a battery voltage sensor 146.

ST24: The regenerative current Irr that flows from the electric motor 10L to the battery 105 via the driver circuit 143L is detected by the electric current sensor 145L.

ST25: A determination is made as to whether the voltage Ebr of the battery 105 has exceeded a predetermined reference voltage Ebs that has been set in advance. If YES, the process proceeds to ST26, and if NO, the process proceeds to ST28. The voltage Ebr increases in accordance with the remaining charge of the battery 105. The reference voltage Ebs is set to a value (e.g., the voltage at which the battery 105 is in a state that is close to a full charge) that prevents the battery 105 from overcharging.

ST26: A determination is made as to whether the regenerative current Irr has exceeded a predetermined reference regenerative current Irs that has been set in advance. If YES, the process proceeds to ST27, and if NO, the process proceeds to ST28. The reference regenerative current Irs is set to the maximum regenerative current (charging current) with consideration given to the durability of the battery 105.

ST27: An unbalanced-regenerative control mode is selected from among the control modes stored in the controller 133.

The unbalanced regenerative control mode is a mode for controlling the three driver circuits 71 to 73 so that the three motor units 81A, 82A, 83A generate torque in a nonuniform manner during regenerative braking. The controller 133 controls the three driver circuits 71 to 73 so that the three motor units 81A, 82A, 83A generate torque in a nonuniform manner by carrying out the unbalanced regenerative control mode. The total torque generated by the three motor units 81A, 82A, 83A, i.e., the combined torque, is the torque that the controller 133 requires (required torque) from the electric motor 10A. The combined torque in this case is a regenerative torque. An example of the unbalanced regenerative control mode will be described with reference to FIGS. 19 and 20.

ST28: A normal regenerative control mode is selected from among the control modes stored in the controller 133.

The normal regenerative control mode is a mode for controlling the three driver circuits 71 to 73 so that the three motor units 81A, 82A, 83A generate torque in a uniform manner during regenerative braking. The controller 133 controls the three driver circuits 71 to 73 so that the three motor units 81A, 82A, 83A generate torque in a uniform manner by carrying out the normal regenerative control mode. The total torque, i.e., the combined torque generated by the three motor units 81A, 82A, 83A, is the torque that the controller 133 requires (required torque) from the electric motor 10A. The combined torque in this case is a regenerative torque. An example of the normal regenerative control mode will be described with reference to FIG. 18.

ST29: The driver circuit 143L is controlled based on the regenerative control mode selected in ST27 or ST28, and the control in the control flow is thereafter ended.

Figure 18:
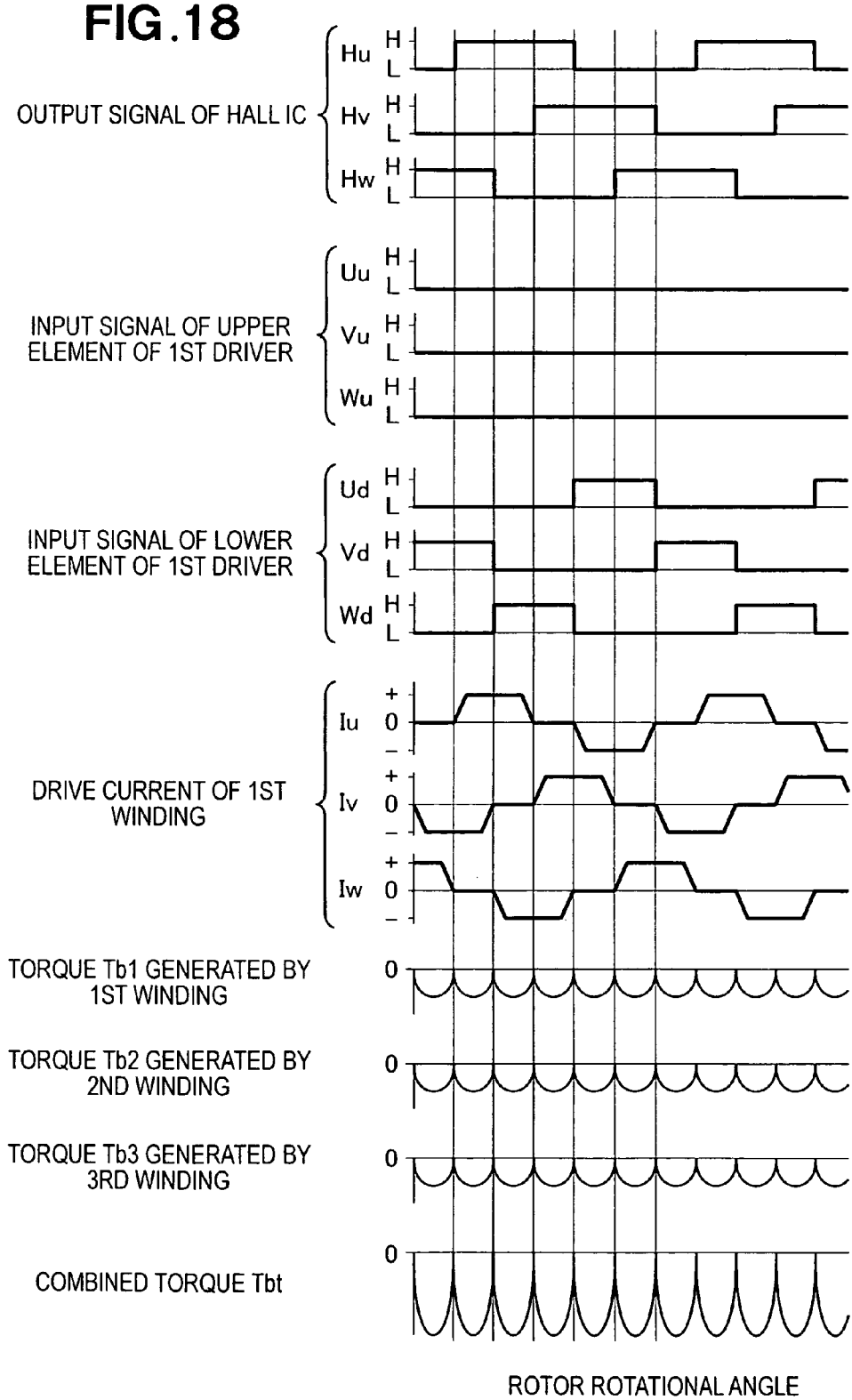
FIG. 18 is a view showing an example of a normal regenerative control mode shown in FIG. 17.

FIG. 18 is a descriptive view of an example of the normal regenerative control mode shown in ST28 in FIG. 17, and uses the same manner of description as FIG. 11. In other words, FIG. 18 shows the control characteristics of a motor unit. The horizontal axis is the rotational angle of the rotor, and the vertical axis is the signal and torque of each part.

The torque generated by the first motor unit 81A (torque generated by the first winding) is Tb1. The torque generated by the second motor unit 82A (torque generated by the second winding) is Tb2. The torque generated by the third motor unit 83A (torque generated by the third winding) is Tb3. Tbt is the total torque, i.e., the combined torque of the three torques Tb1 to Tb3.

First, the first motor unit 81A will be described. The controller 133 sets the signals (input signals Uu, Vu, and Wu) sent to all upper elements in the first driver circuit 71 to a low level signal L during regenerative braking. Accordingly, the generated torque Tb1 of the first winding assumes a negative value.

In a similar manner, the controller 133 presents the second driver circuit 72 and third driver circuit 73 with the same signals as those sent to the first driver circuit 71. Accordingly, the generated torque Tb2 of the second winding and the generated torque Tb3 of the third winding are also negative values.

The values of the generated torques Tb1, Tb2, Tb3 are the same. The combined torque Tbt assumes a negative value obtained by combining Tb1, Tb2, and Tb3, and is therefore a regenerative torque.

In this manner, in accordance with the normal regenerative control mode, the regenerative torque Tbt (required regenerative torque Tbt) that the controller 133 requires from the electric motor 10A can be uniformly distributed to the three motor units 81A, 82A, 83A.

The required regenerative torque Tbt is a value calculated by the controller 133 in accordance with external conditions (e.g., conditions when a load driven by the electric motor 10A is stopped).

Figure 19:
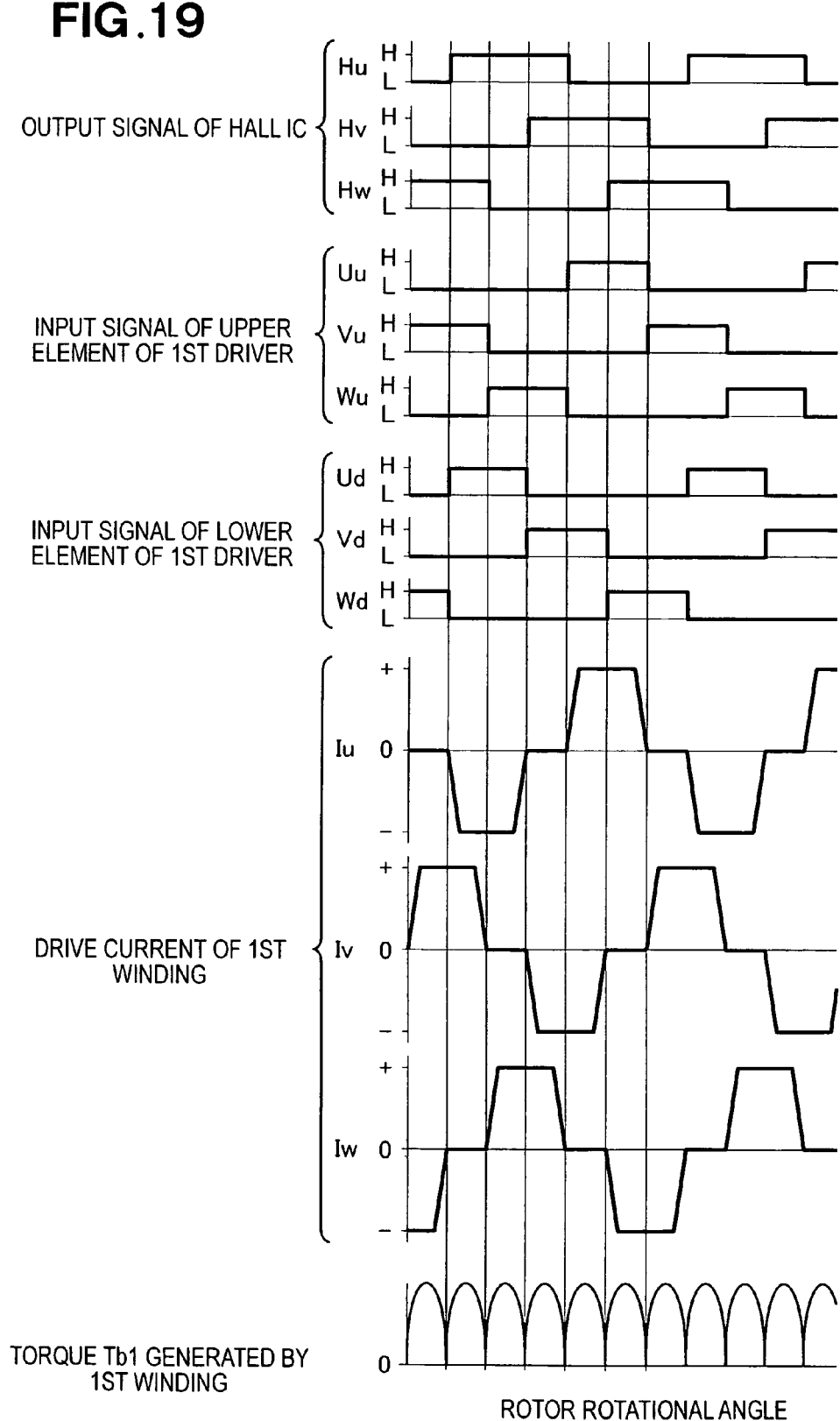
FIG. 19 is a view showing an example of an unbalanced regenerative control mode shown in FIG. 17.

FIG. 19 is shows an example of the unbalanced regenerative control mode shown in ST27 in FIG. 17, and uses the same manner of description as FIG. 18. In other words, FIG. 19 shows the control characteristics of the first motor unit 81A. The horizontal axis is the rotational angle of the rotor, and the vertical axis is the signal and torque of each part.

The controller 133 sends a control signal to the upper element and the lower element in the first driver circuit 71 in accordance with the output signal of the first Hall IC 52 during regenerative braking. Accordingly, the torque Tb1 generated by the first winding assumes a positive value.

Figure 20:
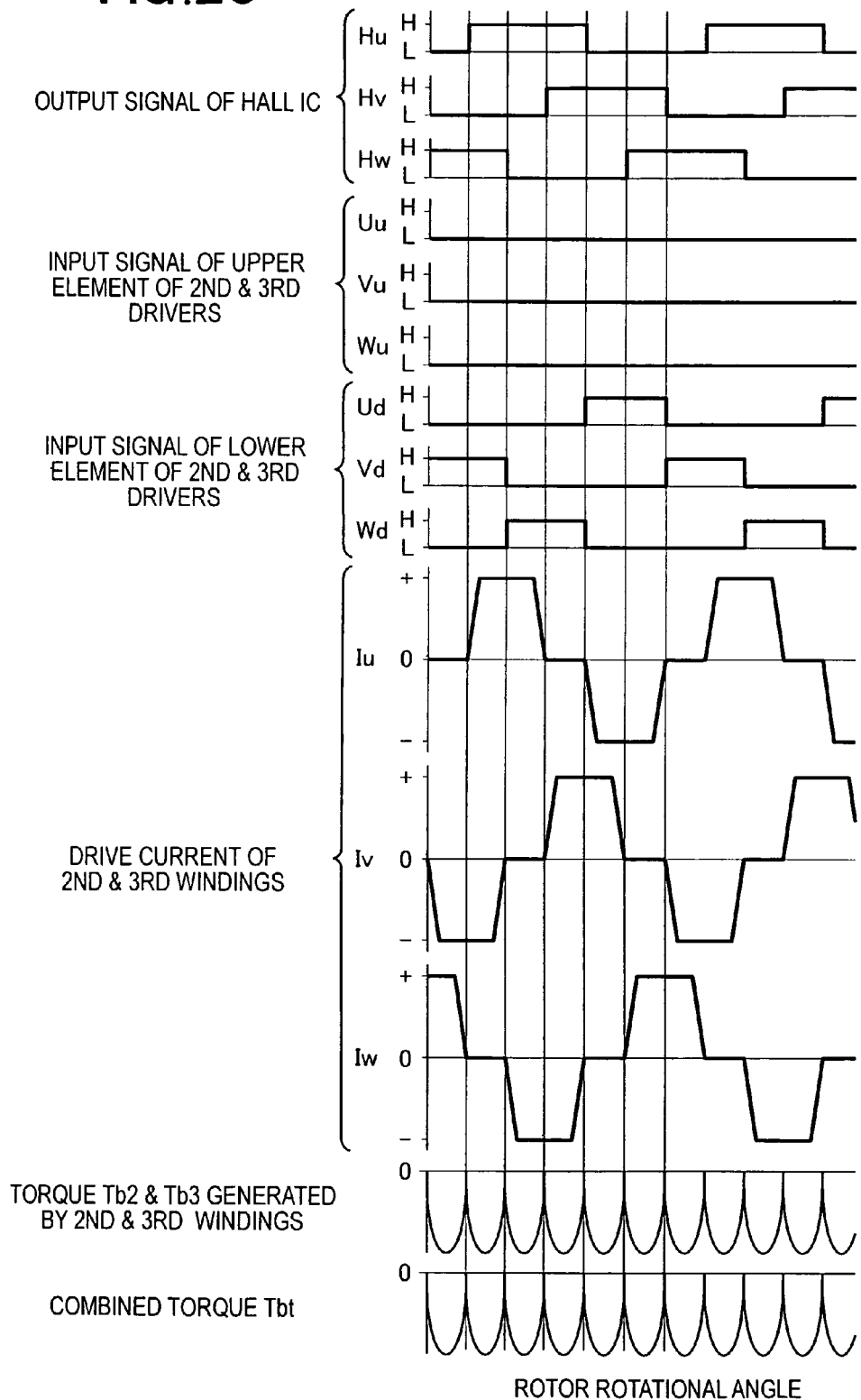
FIG. 20 is a view showing another example of the unbalanced regenerative control mode shown in FIG. 17.

FIG. 20 shows another example of the unbalanced regenerative control mode shown in ST27 in FIG. 17, and uses the same manner of description as FIG. 19. In other words, FIG. 20 shows the control characteristics of the second and third motor units 82A, 83A. The horizontal axis is the rotational angle of the rotor, and the vertical axis is the signal and torque of each part.

The controller 133 sets the signals (input signals Uu, Vu, and Wu) sent to all upper elements in the second and third motor units 82A and 83A to a low level signal L during regenerative braking. Accordingly, the generated torques Tb2, Tb3 assume negative values.

The generated torque Tb1 of the first winding shown in FIG. 19 and the generating torques Tb2, Tb3 of the second and third windings shown in FIG. 20 have the same absolute values. The combined torque Tbt assumes a negative value obtained by combining Tb1, Tb2, and Tb3. In other words, the combined torque Tbt is a regenerative torque.

In this manner, in accordance with the unbalanced regenerative control mode, the regenerative torque Tbt that the controller 133 requires from the electric motor 10A can be unequally distributed to the three motor units 81A, 82A, 83A.

Following is a summary of the relationship between the generated torques Tb1, Tb2, Tb3 of the windings and the required regenerative torque Tbt in the unbalanced regenerative control mode.

The generated torques Tb1, Tb2, Tb3 of the windings can be set by multiplying a predetermined coefficient $\alpha 1$, $\alpha 2$, $\alpha 3$ and a required regenerative torque Tbt. It can be assumed, for example, that the coefficient of the first winding is $\alpha 1$, the coefficient of the second winding is $\alpha 2$, and the coefficient of the third winding is $\alpha 3$. As a result, the generated torques Tb1, Tb2, Tb3 of the windings are determined by the following formulas. As described above, the required regenerative torque Tbt is a negative value.

$$Tb1 = Tbt \times \alpha 1$$

$$Tb2 = Tbt \times \alpha 2$$

$$Tb3 = Tbt \times \alpha 3$$

A condition is set that the conditional expression "α1+α2+α3=+1" be satisfied. For example, the condition may be that α1=−1, α2=+1, and α3=+1.

The generated torque Tb1 of the first winding is thereby assumed to be a normal rotation drive torque. Also, the generated torques Tb2, Tb3 of the second and third windings are assumed to be regenerative torque.

Tb1 is a positive value, and Tb2 and Tb3 are negative values. The absolute value of all these values is the same. Accordingly, the value of Tbt, which is the sum of Tb1, Tb2, and Tb3, is a regenerative torque that is equal to the value of Tb3. The electric motor 10A can be made to perform regenerative braking using the Tbt.

Tb1, Tb2, and Tb3 are actively set to unequal (unbalanced) values, whereby power regenerated in the battery 105 can be reduced even if the torque outputted from the electric motor 10A to the exterior is the same as in the case of the normal regenerative control mode shown in FIG. 18.

A more specific description follows. Only the relationship between the torque, the electric current, and efficiency will be described to facilitate understanding.

Here, ηo is the efficiency (efficiency during motor driving) during generation of drive torque by a common electric motor. The drive torque is proportional to the product of the motor drive current and the efficiency ηo. In other words, the motor drive current is proportional to the product of the drive torque and the reciprocal (1/ηo) of the efficiency ηo.

Also, ηi is the efficiency (efficiency during regenerative braking) during generation of regenerative current by the electric motor in accordance with the regenerative torque during regenerative braking. The regenerative current is proportional to the product of the regenerative torque and the efficiency ηi. The efficiency ηi may be considered to be substantially equal to the efficiency ηo.

The efficiency ηtu of the entire motor is equal to the efficiency ηi (ηtu=ηi) in the normal regenerative control mode shown in ST28 of FIG. 17.

In contrast, the motor drive current I1 of the first winding is proportional to the product of the drive torque and the reciprocal of the efficiency ηo (1/ηo) in the unbalanced control mode shown in ST27 of FIG. 17. The motor drive current I2 of the second winding is proportional to the product of the drive torque and the efficiency ηi. The motor drive current I3 of the third winding is proportional to the product of the drive torque and the efficiency ηi.

It is apparent that the drive torque is a positive value and the regenerative torque is a negative value. The drive current I1 is a positive value, and the regenerative currents I2, I3 are negative values. Since the regenerative torque of the entire motor is a negative value, the regenerative current It of the entire motor is a negative value obtained using the formula It=I1+I2+I3. Therefore, the efficiency ηta of the entire motor can be obtained using the formula ηta=2×ηi−(1/ηo).

It is apparent from the description above that the efficiency ηta of the entire motor in the unbalanced regenerative control mode is poor in relation to the efficiency ηtu of the entire motor in the normal regenerative control mode (ηtu>ηta). Therefore, the power regenerated in the battery is reduced in the unbalanced regenerative control mode in comparison with the power regenerated in the battery in the normal regenerative control mode.

In the modified example shown in FIGS. 15 to 20, the controller 133 thus sends different control signals to the driver circuits 71, 72, 73 during regenerative braking when the voltage Ebr of the battery 105 exceeds a predetermined reference voltage Ebs (e.g., the voltage at which the battery 105 is in a state that is close to a full charge) and when the regenerative current Irr has exceeded a predetermined reference regenerative current Irs.

On the other hand, the controller 133 sends the same control signals to all the driver circuits 71, 72, 73 when the voltage Ebr of the battery 105 has not exceeded a predetermined reference voltage Ebs and when the regenerative current Irr has not exceeded a predetermined reference regenerative current Irs.

In this manner, different control signals can be sent by the controller 133 to the driver circuits 71, 72, 73 in order to prevent the battery 105 from being overcharged by regenerative braking when the battery 105 is fully charged. For this reason, resistors designed to accommodate considerable regenerative current when the battery 105 is fully charged do not need to be provided. Therefore, a power apparatus 90A that can perform regenerative braking can have a simple configuration.

The electric motor 10A is comprised of a single motor shaft 21A, at least one rotor 22A, and a plurality of stators 31, 32, 39. The windings 38 of the stators 31, 32, 39 are electrically independent in each of the stators 31, 32, 39. The driver circuits 71, 72, 73 are divided into a plurality of units so as to individually supply drive current to the windings 38 of the stators 31, 32, 39. The controller 133 can individually control a plurality of driver circuits 71, 72, 73.

Accordingly, the capacity of the driver circuits 71, 72, 73 to supply electric current can be kept low. The driver circuits 71, 72, 73 can be made smaller.

The driver circuits 71, 72, 73 generate heat. In response to this situation, the driver circuits 71, 72, 73 are divided into a plurality of units, and the heat radiated from the driver circuits 71, 72, 73 can therefore be dispersed. Accordingly, a heat sink for cooling the driver circuits 71, 72, 73 can be made smaller. Therefore, the power apparatus 90A can be reduced in size.

Next, a modified example of the self-propelled snow remover 100 shown in FIGS. 7 and 8 will be described with reference to FIG. 21. The same reference numerals are used for the same configuration as the electric motor 10 and the self-propelled snow remover 100 shown in FIGS. 1 to 14, and a description thereof is omitted.

Figure 21:
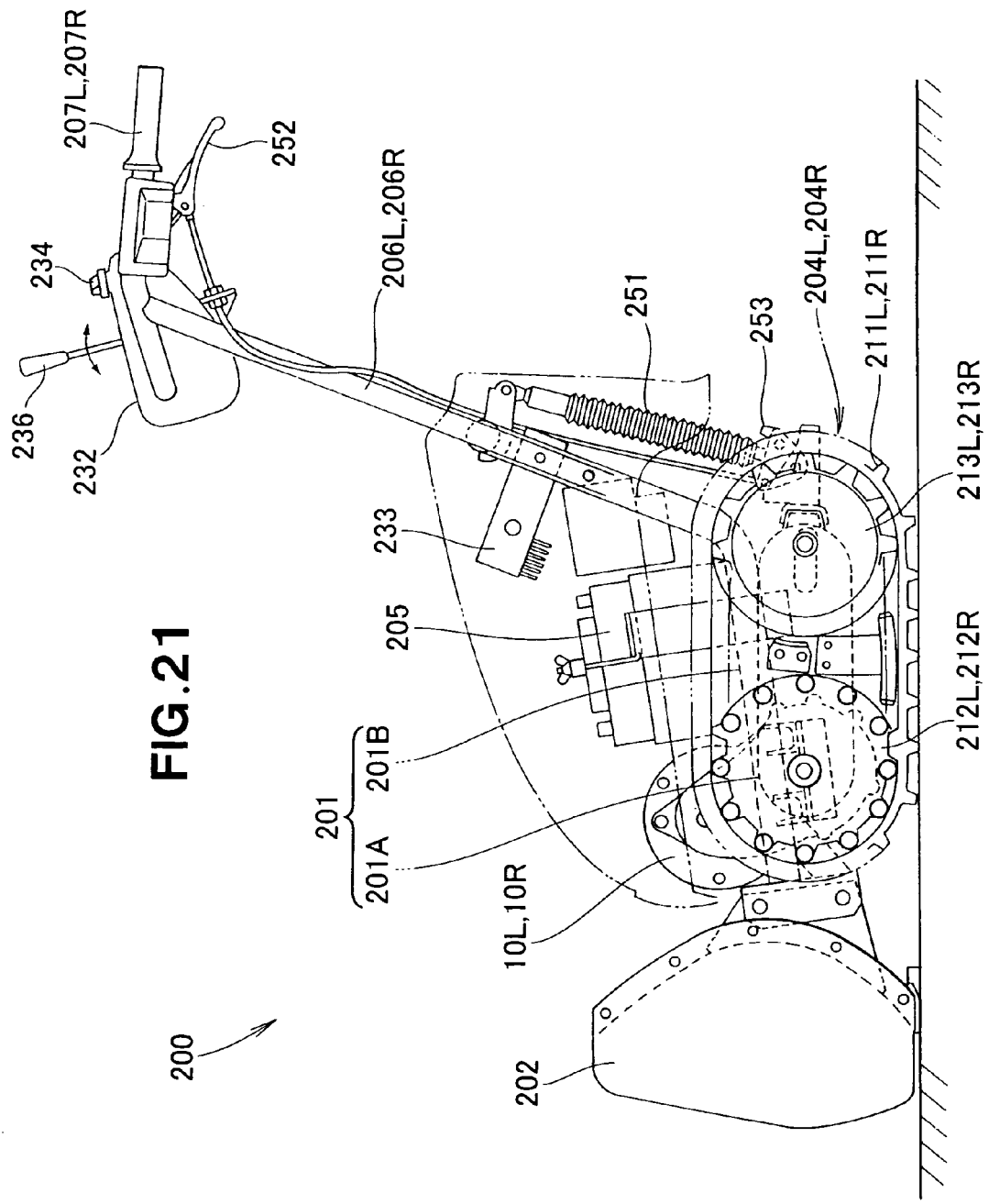
FIG. 21 is a side elevational view showing a modification of the self-propelled snow remover.

FIG. 21 is a side view showing a modified example of the self-propelled snow remover according to the present invention.

The chassis 201 of the self-propelled snow remover 200 of the modified example has a dozer-type snow removing implement 202; crawler-type left and right travel units 204L, 204R; and left and right traveling electric motors 10L, 10R for driving only the left and right travel units 204L, 204R.

The chassis 201 is comprised of a travel frame 201A provided with both left and right travel units 204L, 204R and electric motors 10L and 10R, and a vehicle frame 201B mounted on the rear portion of the travel frame 201A so as be capable of swinging in the vertical direction.

The vehicle frame 201B is provided with a battery 205 and left and right operation handles 206L, 206R that extend from the rear to the upper rearward area. The left and right operation handles 206L, 206R have grips 207L, 207R, respectively, at the distal ends thereof.

An extension mechanism 251 is disposed between the rear portion of the travel frame 201A and the vehicle frame 201B.

The snow removing implement 202 is comprised of a dozer (snow removing member) for pushing snow forward. The battery 205 corresponds to the battery 105 shown in FIG. 8.

The left and right travel units 204L, 204R are driven only by the traveling electric motors 10L, 10R, and are comprised of left and right crawler belts 211L, 211R, forwardly disposed left and right drive wheels (travel wheels) 212L, 212R, and rearwardly disposed left and right rolling wheels 213L, 213R. Torque generated by the left electric motor 10L drives the left crawler belt 211L via the left drive wheel 212L. Torque generated by the right electric motor 10R drives the right crawler belt 211R via the right drive wheel 212R.

This type of self-propelled snow remover 200 rakes up snow using a front dozer while travelling in the forward direction to remove snow, and is therefore referred to as an dozer-type snow remover. An operator can operate the self-propelled snow remover 200 by using the operation handles 206L, 206R while walking alongside the self-propelled snow remover 200.

One of the left and right operation handles 206L, 206R is provided with a height adjustment lever 252. The extension mechanism 251 is shortened only when the operator grasps the height adjustment lever 252, whereby the vehicle frame 201B swings upward with respect to the rear portion of the travel frame 201A. As a result, the snow removing implement 202 swings upward.

The extension mechanism 251 extends when the operator thereafter releases the height adjustment lever 252, whereby the vehicle frame 201B swings downward with respect to the rear portion of the travel frame 201A. As a result, the snow removing implement 202 swings downward.

A lower-end position sensor 253 emits an ON signal when the snow removing implement 202 has been lowered to a position in which snow can be removed, as shown in FIG. 21.

An operation panel 232 and a controller 233 are disposed between the left and right operation handles 206L, 206R. The operation panel 232 is provided with a main switch 234 and a forward/reverse speed operating part 236. The main switch 234 corresponds to the main switch 134 shown in FIG. 8. The forward/reverse speed operating part 236 corresponds to the forward/reverse speed operating part 136 shown in FIG. 8.

The controller 233 corresponds to the controller 133 shown in FIG. 8. The presence or absence of the left- and right-turn operating switches 137L, 137R and the left and right electromagnetic brakes 142L, 142R shown in FIG. 8 is arbitrary. Other members shown in FIG. 8 are also provided to the self-propelled snow remover 200 of the modified example.

In the embodiments of the present invention, the electric motors 10, 10A are not limited to being inner rotor motors, and may also have outer rotor motors.

Each of the electric motors 10, 10A may have a configuration that is comprised of a single motor shaft 21, 21A; at least one rotor 22, 23, 22A provided to the motor shaft 21, 21A; and a plurality of stators 31, 32, 39 arranged in the axial direction of the motor in correspondence to the rotor 22, 23, 22A.

The electric motor 10 is not limited to a configuration in which a plurality of windings 38 is provided to the stators 31, 32, and the configuration may be one which the windings are provided to each of the rotors 22, 23. The electric motor 10A of the modified example is not limited to a configuration in which a plurality of windings 38 is provided to the stators 31, 32, 39, and the configuration may be one which the windings are provided to each of the rotor 22A. In such case, a plurality of permanent magnets 26 can be provided to the stators 31, 32, 39.

The controller 133 and the left and right driver circuits 143L, 143R may be incorporated in any combination into a single unit.

A configuration may also be possible in which a plurality of travel devices is driven by a single electric motor 10, 10A.

The electric motor 10, 10A of the present invention can be mounted in a self-propelled snow remover 100, 200.

Obviously, various minor changes and modifications of the present invention are possible in light of the above teaching. It is therefore to be understood that within the scope of the appended claims the invention may be practiced otherwise than as specifically described.

What is claimed is:
1. An electric motor comprising:
a motor shaft;
a plurality of rotors arranged in an axial direction of and secured to the motor shaft;
a plurality of stators arranged in the axial direction so as to individually correspond to the rotors; and
a plurality of inter-rotor spacers, said inter-rotor spacers each including a plurality of positioning holes disposed in mutually offset phases,
wherein the stators are disposed with mutually matching phases while the rotors are disposed with mutually offset phases and said plurality of positioning holes facilitate disposal of the rotors with mutually offset phases.

2. An electric motor comprising:
a motor shaft;
a plurality of rotors arranged in an axial direction of and secured to the motor shaft;
a plurality of stators arranged in the axial direction so as to individually correspond to the rotors; and
a plurality of inter-stator spacers, said inter-stator spacers each including a plurality of positioning holes disposed in mutually offset phases,
wherein the rotors are disposed with mutually matching phases while the stators are disposed with mutually offset phases and said plurality of positioning holes facilitate disposal of the stators with mutually offset phases.

3. A power apparatus comprising:
an electric motor;
a plurality of driver circuits for supplying drive current to the electric motor;
a controller for controlling the driver circuit;
the electric motor comprising:
a motor shaft,
at least one rotor provided on the motor shaft, and
a plurality of stators arranged along the motor shaft in correspondence with the rotor;
wherein each of the stators has at least one electrically independent winding, the number of driver circuits corresponds to the number of stators, each driver circuit is comprised of a plurality of units for individually supplying drive current to each winding of a respective stator in the electric motor, and the controller individually controls the driver circuits so as to individually control the at least one winding of each stator, and
wherein the controller controls the driver circuits such that drive current is supplied only to predetermined windings in the stator windings when a determination is made that a condition has been satisfied that the drive current supplied from the driver circuits to the electric motor has fallen below a predetermined reference current.

4. The power apparatus of claim 3, wherein the controller sends different control signals to each of the driver circuits when both a condition that a voltage of a battery for supplying power to the electric motor has exceeded a predetermined reference voltage and a condition that a regenerative electric current sent to the electric motor during regenerative braking has exceeded a predetermined reference regenerative electric current are determined to have been satisfied, and the controller sends a same control signal to all of the driver circuits when the two conditions are not satisfied.

5. A self-propelled snow remover comprising:
snow-removal implements including an auger and a dozer;
travel devices including crawlers and wheels;
traveling electric motors provided for exclusively driving the travel devices; and
a plurality of driver circuits; and
a controller for controlling the traveling electric motors by sending a control signal to the driver circuits,
wherein each of the traveling electric motors comprise:
a motor shaft;
a rotor provided on the motor shaft; and
a stator disposed in such a manner as to correspond to the rotor,
one of the rotor and the stator being divided into a plurality of members arranged in an axial direction of the motor, the divided members each having at least one electrically independent winding, the number of driver circuits corresponds to the number of divided members, each driver circuit is comprised of a plurality of units for individually supplying drive current to each winding of a respective divided member, and the controller individually controls the driver circuits so as to individually control the at least one winding of each divided member.

6. The self-propelled snow remover of claim 5, wherein the controller controls the driver circuits such that drive current is supplied only to predetermined windings in the stator windings when a determination is made that a condition that the drive current supplied from the driver circuits to the electric motor has fallen below a predetermined reference current has been satisfied.

7. The self-propelled snow remover of claim 5, wherein the controller sends different control signals to each of the driver circuits when both a condition that a voltage of a battery for supplying power to the electric motor has exceeded a predetermined reference voltage and a condition that a regenerative electric current sent to the electric motor during regenerative braking has exceeded a predetermined reference regenerative electric current are satisfied, and the controller sends a same control signal to all of the driver circuits when the two conditions are not satisfied.

* * * * *